US012776552B2

(12) United States Patent
Tong

(10) Patent No.: US 12,776,552 B2
(45) Date of Patent: Oct. 27, 2026

(54) POWER SUPPLY APPARATUS AND COMPONENTS THEREOF

(71) Applicant: Yui Lung Tong, Hong Kong (CN)

(72) Inventor: Yui Lung Tong, Hong Kong (CN)

( * ) Notice: Subject to any disclaimer, the term of this patent is extended or adjusted under 35 U.S.C. 154(b) by 1167 days.

(21) Appl. No.: 17/780,514

(22) PCT Filed: Dec. 2, 2020

(86) PCT No.: PCT/IB2020/061356

§ 371 (c)(1),
(2) Date: May 26, 2022

(87) PCT Pub. No.: WO2021/111313

PCT Pub. Date: Jun. 10, 2021

(65) Prior Publication Data

US 2022/0416368 A1 Dec. 29, 2022

(30) Foreign Application Priority Data

Dec. 2, 2019 (HK) ................................ 19133066.1
Jun. 29, 2020 (HK) .......................... 22020010130.5

(51) Int. Cl.

| | |
|---|---|
| ***H01M 50/51*** | (2021.01) |
| ***H01M 10/0525*** | (2010.01) |
| ***H01M 10/613*** | (2014.01) |
| ***H01M 10/625*** | (2014.01) |
| ***H01M 10/655*** | (2014.01) |

(Continued)

(52) U.S. Cl.

CPC ....... *H01M 50/51* (2021.01); *H01M 10/0525* (2013.01); *H01M 10/613* (2015.04); *H01M 10/625* (2015.04); *H01M 10/655* (2015.04); *H01M 50/204* (2021.01); *H01M 50/244* (2021.01); *H01M 50/249* (2021.01);

(Continued)

(58) Field of Classification Search

CPC ........... H01M 50/249; H01M 10/0525; H01M 10/625; H01M 50/296; H01M 50/204; H01M 50/244; H01M 50/51; H01M 10/655; H01M 10/613

See application file for complete search history.

(56) References Cited

U.S. PATENT DOCUMENTS

2012/0135296 A1 5/2012 Itoi et al.
2013/0323558 A1* 12/2013 Darch ............... H01M 10/6555 429/100

(Continued)

FOREIGN PATENT DOCUMENTS

WO 2020110095 A1 6/2020
WO 2020110096 A1 6/2020

OTHER PUBLICATIONS

International Search Report of PCT Patent Application No. PCT/IB2020/061356 issued on Mar. 30, 2021.

*Primary Examiner* — Holly Rickman

(57) ABSTRACT

A battery module comprising a plurality of battery units held in a corresponding plurality of battery receptacles, a plurality of inter-battery connectors interconnecting the plurality of battery units, a battery tray comprising the plurality of battery receptacles, and a power interface to facilitate power input and power output; wherein the inter-battery connector is configured as a heat dissipation member which extends through a first plurality of battery receptacles to interconnect a corresponding plurality of battery units.

20 Claims, 12 Drawing Sheets

(51) Int. Cl.

| | |
|---|---|
| ***H01M 50/204*** | (2021.01) |
| ***H01M 50/244*** | (2021.01) |
| ***H01M 50/249*** | (2021.01) |
| ***H01M 50/289*** | (2021.01) |
| ***H01M 50/296*** | (2021.01) |

(52) U.S. Cl.
CPC ....... *H01M 50/289* (2021.01); *H01M 50/296* (2021.01); *H01M 2220/20* (2013.01)

(56) References Cited

U.S. PATENT DOCUMENTS

| | | | | |
|---|---|---|---|---|
| 2014/0377622 | A1 | 12/2014 | Glauning | |
| 2015/0086827 | A1 | 3/2015 | Sun et al. | |
| 2019/0305395 | A1* | 10/2019 | Favaretto .......... | H01M 10/6556 |

* cited by examiner

POWER SUPPLY APPARATUS AND COMPONENTS THEREOF

FIELD

The present disclosure relates to power supply apparatus, and more particularly to mobile power supply apparatus and components thereof.

BACKGROUND

Mobile apparatuses are increasingly powered by electrical energy, which is considered a green or greener energy. The amount of electrical energy that is available to power a mobile apparatus such as an electrical vehicle is often limited and depends on energy stored on the apparatus. Situations can become awkward when stored energy is used up while the mobile apparatus is away from a charging station. Mobile power supply apparatus that can supply energy to a mobile apparatus powered by stored electrical energy would be useful and desirable.

SUMMARY

A power supply apparatus comprising a stored energy source, a power interface, and electronic circuitries configured to control operations of the apparatus is disclosed. The stored energy source can be charged to store electrical energy and discharged to release stored energy. The apparatus may be configured as a power station, for example, a mobile power station, for supplying power to a load, for example, an electric vehicle.

The apparatus, nicknamed MOBO-I, comprises a main housing, wheels supporting the main housing to provide mobility, and a battery assembly and an assembly of electronic circuitries contained in the main housing, wherein the battery assembly comprises a plurality of battery modules connected in series and/or parallel, wherein each battery module comprises a module housing, an ensemble of battery units connected in series and/or in parallel, and ventilating means to move air in and/or out of the battery module.

DESCRIPTION OF FIGURES

The present disclosure is described by way of example with reference to the accompanying figures, in which.

DESCRIPTION

Figure 1A:
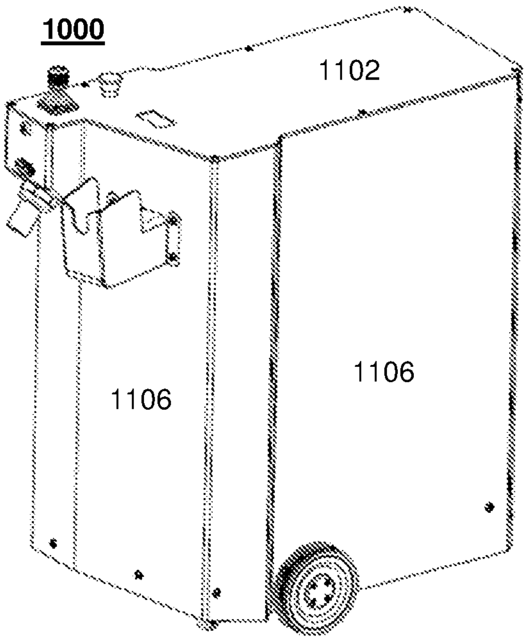
FIGS. 1A and 1B are, respectively, a front perspective view and a rear perspective view of an example power supply apparatus.
Figure 1B:
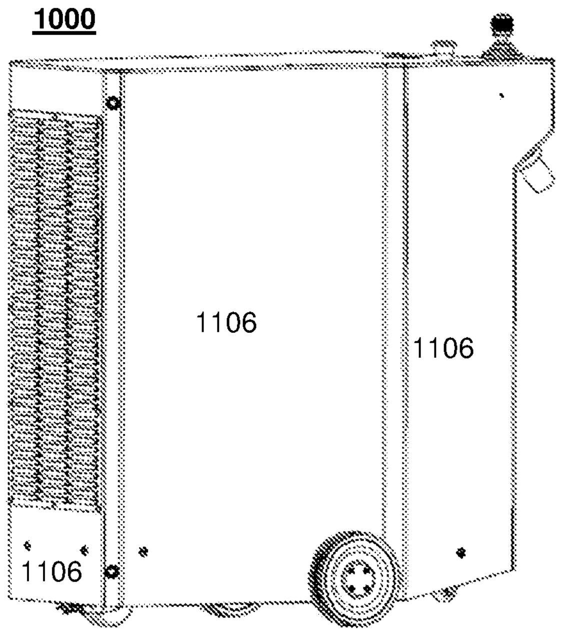
Figure 1C:
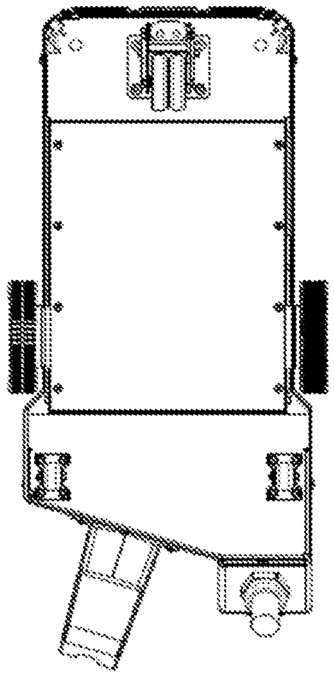
FIG. 1C is a bottom view of the apparatus of FIG. 1A, FIGS. 1D and 1E are, respectively, front and front perspective views of the apparatus with front panel removed.

An example power supply apparatus 1000 comprises a main housing on which a stored energy source, a power interface, and electronic circuitries for controlling operations of the apparatus are mounted. The apparatus 1000 is mobile and comprises a main housing 1100 which is supported on a plurality of wheels, as shown in FIGS. 1A and 1B. The wheels are mounted on a chassis 1120 which is a base of the main housing, as shown in FIG. 10.

Figure 1D:
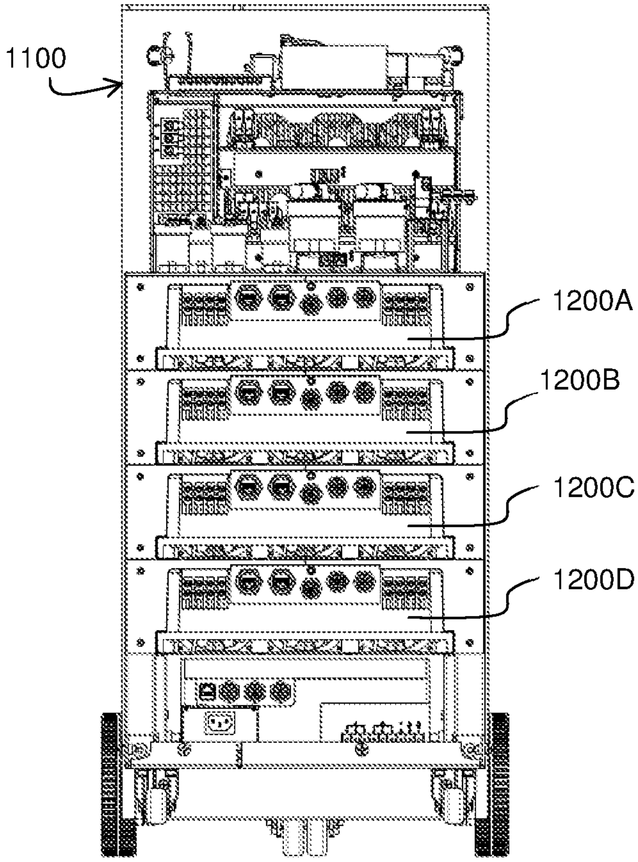
FIG. 1F is a perspective view showing the chassis of the apparatus with the drive arrangements mounted thereon.
Figure 1E:
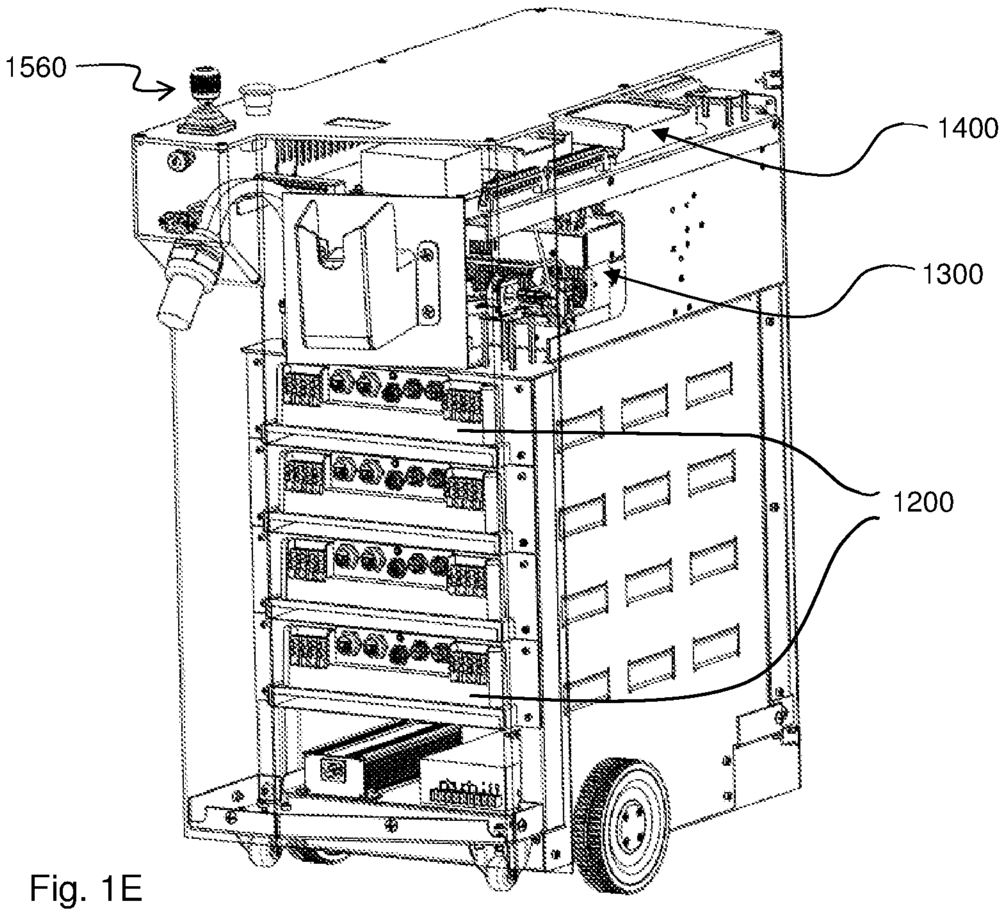

A battery assembly comprising a plurality of battery modules forms an example stored energy source of the apparatus 1000. The battery assembly comprises an example plurality of 4 battery modules 1200A, B, C, D, as shown in FIGS. 1D and 1E.

The electronic circuitries comprise power circuitries, communication circuitries and control circuitries. The power circuitries comprise power input circuitry and power output circuitry. The power input circuitry may comprise a first power converter which may be an AC-DC converter, and the power output circuitry may comprise a second power converter which may be a DC-DC converter. The AC-DC converter may be configured to convert mains AC power into DC power for internal operation of the apparatus, for example charging of the battery assembly. The DC-DC converter may be configured to convert a battery voltage assembly into another DC voltage for output. The DC output voltage may be higher or lower than the battery assembly voltage. The power circuitries may be configured as a power input module comprising a power input port, a power output port and an AC-DC converter interconnecting the power input port and the power output port; and a power output module comprising a power input port, a power output port and an DC-DC converter interconnecting the power input port and the power output port.

The communication circuitries may comprise internal communication circuities to facilitate data communications within the apparatus and external communication circuities to facilitate data communications between the apparatus and the outside world, such as other compatible power supply apparatus. The communication circuitries may comprise data communication frontends and may be configured as a communication module or a plurality of modules.

The control circuitries are configured to control operations of the apparatus and comprise a battery management system ("BMS") which is configured to control battery operations including battery charging and battery discharging. The control circuitries may be configured as a control module or a plurality of control modules. The battery management system is configured to monitor parameters of the battery assembly and the individual battery modules of the battery assembly. The parameters may include electrical parameters such as the charging rate, discharging rate, state-of-charge (SoC), loop-current, and/or state-of-health (SoH); and/or physical parameters including temperature, humidity, and/or internal pressure of a battery module.

The main housing 1100 comprises a top portion having a top panel 1102, a bottom portion having a bottom panel 1104, and a peripheral wall 1106 interconnecting the top portion and the bottom portion. The top panel, the bottom panel and the peripheral wall cooperate to form a cabinet having an internal compartment inside which components of the apparatus, including the electronic circuitries and the battery assembly, are housed. The example main housing is organized into a plurality of shelves, compartments and/or receptacles for housing the battery modules 1200, the power modules 1300, the control modules 1400, and the communication modules. The peripheral wall may comprise a plurality of side panels. One or some of the side panels may be detachable to permit servicing access to the interior of the main housing in which the modules are housed. The main housing may include a rigid rack frame on which the top panel and the peripheral wall are mounted. The rack frame may comprise slotted vertical columns for the modules to be mounted, for example, detachably mounted.

The main housing may include venting apertures so that thermal exchange by means of air exchange, for example, forced air exchange, between the apparatus and the ambient environment can take place. By having an exchange of air between the apparatus and the ambient environment through the venting apertures, thermal exchange by means of air flowing into or out of the main housing can condition the internal temperature of the apparatus to maintain optimal or preferred thermal conditions of the apparatus. In example embodiments such as the present, venting apertures in the form of a ventilating grille is formed on the peripheral wall to permit thermal exchange through air flow across the peripheral wall. In example embodiments, venting apertures are formed on a rear panel of the main housing, as shown in FIG. 1B.

The example apparatus comprises an example plurality of four battery modules which are arranged to form a stack of battery modules, as shown in FIG. 1E. The battery modules are retained inside a battery compartment which is surrounded by the peripheral wall and above the chassis. The power modules, the control modules, and the communication modules are retained in a compartment which is located above the battery compartment because of their lighter weight (compared to the battery modules) and for easier access by user and/or operators. The example battery modules have same specifications (including substantially same for the avoidance of doubt), including rated voltages, rated power and outer dimensions, and are arranged in a vertically aligned manner.

The example apparatus has a form factor of a tower, with a height which is significantly larger than its base dimension, which can be width or length of the bottom portion of the main housing, so than more energy can be stored per unit base area which defines a cross-sectional area of the main housing. The term significantly larger herein means at least 20% larger, including 30%, 40%, 50%, 60%, 80%, 100%, 150%, 200% or more.

The tower form also facilitates a higher stored energy density so that more energy can be stored per unit volume of the main housing. In the example apparatus, a battery module is configured so that the battery units of the battery module occupy a substantial portion of the cross-sectional area of the battery compartment. A substantial portion herein means at least 50%, including 55%, 60%, 65%, 70%, 75%, 80% or more.

The example apparatus has an example height of approximately 1 m (988 mm), an example width of approximately 0.5 m (430 mm), an example a length of approximately 1 m (900 mm), an example volume of 0.382 CBM, and a de-rated energy storage capacity of 8.0 kWh (4 modules of 2 kWh each), corresponding to a de-rated energy storage capacity of higher than 16 kWh per cubic meter (CBM).

The main housing of the example apparatus has an internal compartment volume of approximately 0.27 CBM, that is, less than 0.3 CBM, a de-rated energy storage capacity of 8 kWh, and a weight of 150 kg, corresponding to a de-rated stored energy density of 29.6 kWh per CBM internal compartment volume (=8/0.27). A de-rated stored energy density of above 20 or 25 kWh per CBM internal compartment volume provides a compact power bank for servicing a load which requires a larger energy supply to operate. The de-rated stored energy density can be increased to over 30 or 35 kWh per CBM internal compartment volume by adding an additional battery module. De-rated energy herein means energy of the batter cells or the battery module available above the minimum voltage.

The battery modules may be connected in series and/or parallel. In example embodiments, the battery modules are connected in series so that the battery assembly has a nominal voltage rating of 403.2 V, equal to 4 times the nominal voltage rating of a battery module.

The example apparatus comprises a human machine interface to facilitate interface between a human operator and the machine. The human machine interface may comprise a display, such as an LCD display panel or an LCD touch panel, and optionally a manual control device such as a control stick. In example embodiments, the LCD touch panel may be configured to function as an interface between a user and the machine to achieve operation control of the apparatus, including mechanical control of the drive mechanism.

The apparatus may be configured as a mobile energy source and wheels are provided to facilitate mobility. The wheels may be free-running and/or power driven. Referring to FIGS. 1D and 1E, the main housing of the example apparatus comprises a drive compartment inside which a drive arrangement is retained. The drive arrangement comprises a drive mechanism 1510 which is configured to drive a pair of wheels 1520. The drive mechanism may comprise a motor having a motor shaft and a transmission arrangement such as a gear box which is configured to interconnect the motor shaft and the driven wheels, and control electronics to control operation of the motor. The control electronics may comprise a motor drive controller and peripheral circuits. The driven wheels of the example apparatus are intermediate free-running wheels which are forward and rearward of the drive wheels.

The drive arrangement optionally comprises power arrangements which are dedicated for the drive mechanism.

Figure 1F:
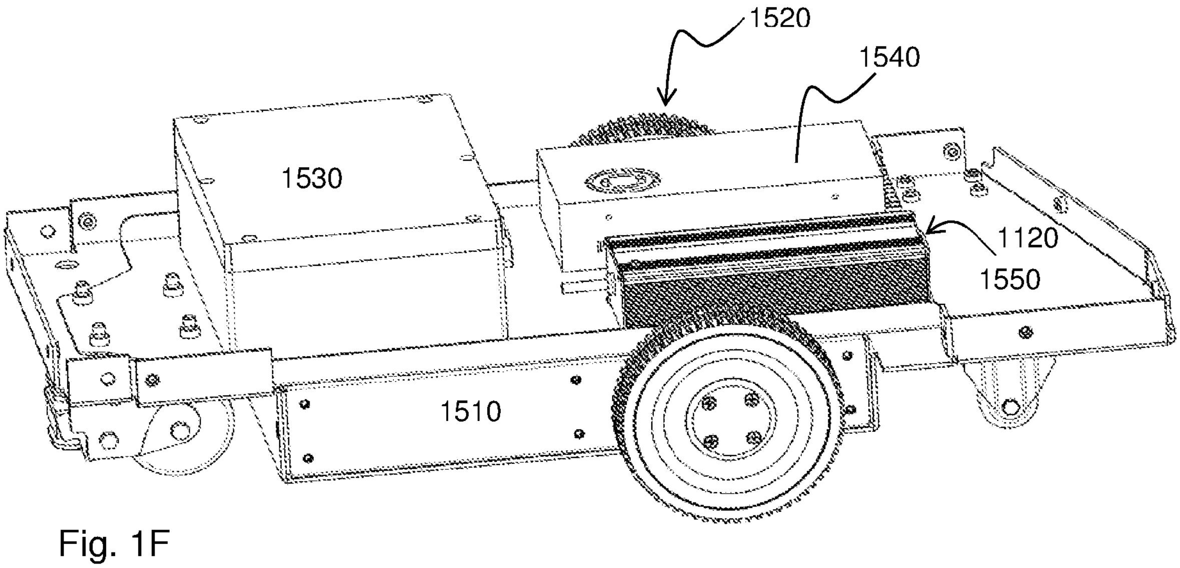

The drive arrangement may comprise a drive battery assembly 1530, a DC-DC converter 1540, and an AC-DC converter 1550, as shown in FIG. 1F. The example drive battery assembly has an example rated voltage of 50V, comprising a 14S3P configuration of battery units; the AC-DC converter is devised to convert mains power to DC power for charging the drive battery assembly and has an example rated power of 160 W; and the DC-DC converter has an example rated voltage of 12V and an example rated power of 330 W for converting DC power of the drive battery assembly to a 12V DC output for electronics associated with the drive arrangement. In example embodiments, the drive mechanism may tap power from the main battery assembly, comprising the battery modules 1200 without loss of generality. The drive compartment is a lowest compartment which is below the battery compartment and is intermediate the chassis and the main battery assembly. In embodiments where no power supply is dedicated to the drive mechanism, the lowest compartment may be used as a battery compartment without loss of generality.

The apparatus may be driven to move under manual control and/or automated control. The automated control may be by local control or remote control. To facilitate manual control, a drive control device 1560 is provided on the main housing, for example, on the top panel, as shown in FIG. 1E.

The drive control device 1560 may be configured as a drive stick which is to function as a user interface for a user to control movement of the apparatus. The example drive stick protrudes upwardly from the top panel of the main housing and is electrically connected to the electronic control circuitries of the drive mechanism. The drive stick may have a plurality of pre-determined discrete operation positions to correspond to a plurality of modes. The modes may comprise, for example, a recharge/parked mode during which the wheels are locked, a move mode during which the wheels are released and not locked, a charge mode during which the apparatus is to output stored power to an external load, and an OFF mode during which the apparatus is shown down. In example embodiments, a touch panel may be configured as a drive control device. The drive control device is devised on the outside of the main housing to facilitate manual control of a user from outside of the apparatus. The drive control device may be configured at a height so that a user of an average height can operate the drive control device to drive the apparatus to move while standing or walking next to the mobile apparatus. For example, the drive control device may be located at a height of between 1 m and 1.6 m from a supporting ground.

The control circuitries of the example apparatus are received in the top receptacle and further comprises an EMS ("energy management system") module, charging standard modules, a data frontend module, a general control module. The top receptacle herein is a receptable which is most proximal to the top panel of the main housing. The charging standard modules may include a CHAdeMo Manager module, a CCS Combo Manager module, a GB module. The charging standard modules may be separate modules or may be an integrated management module configured to work with systems conforming to a plurality of charging standards prevalent at the time without loss of generality. In example embodiments, the receptacles are parallel and the modules are substantially horizontal when the apparatus is placed in a level ground.

Figure 2A:
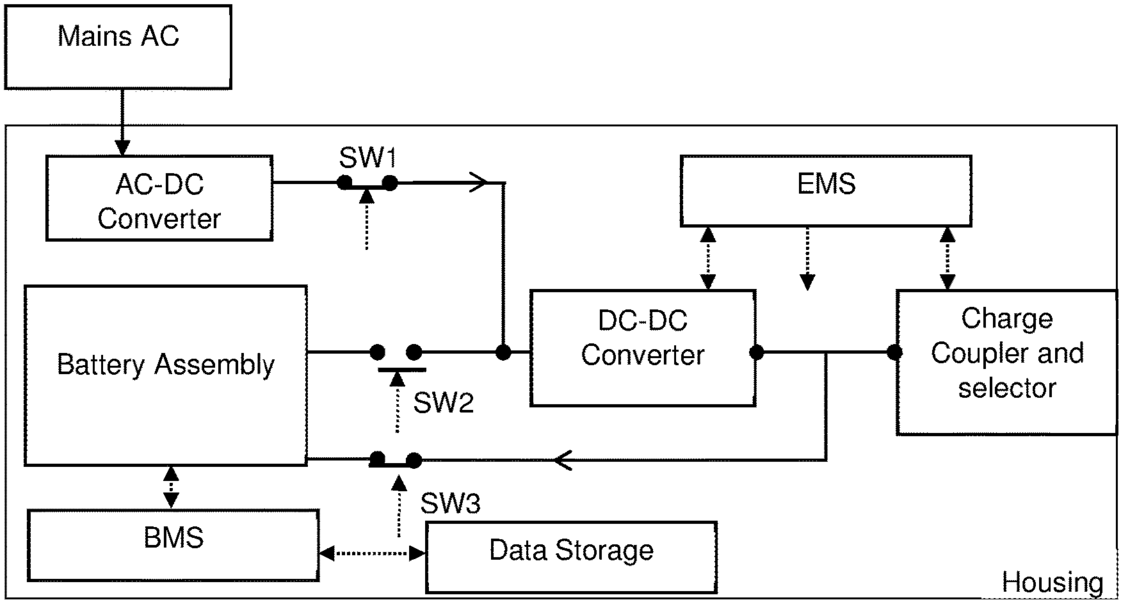
FIG. 2A is a schematic block diagram showing the apparatus connected to an external power source.

Referring to FIG. 2A, input of the AC-DC converter is connected to a power source, output of the AC-DC converter is connected to the input of the DC-DC converter by a first switchable link, output of the battery assembly is connected to the input of the DC-DC converter by a second switchable link, and output of the DC-DC converter is connected to the battery assembly by a third switchable link. The first switchable link comprises a first power switch SW1 which is operable to open or to close the first switchable link. The second switchable link comprises a second power switch SW2 which is operable to open or to close the second switchable link. The third switchable link comprises a third power switch SW3 which is operable to open or to close the third switchable link. Each of one the first, second and third power switches is operable in an on-state or an off-state by the electronic control circuitries.

The apparatus may operate in a plurality of modes, including a standby mode and a power output mode.

When in the standby mode, the battery assembly may be charged or not charged, depending on the stored energy level of the battery assembly. When the BMS determines that that the battery assembly has a good energy level, the BMS controller would operate in a non-charging mode and to not to charge the battery assembly. When the BMS determines that that the battery assembly does not have a good energy level, the BMS controller would operate in a charging mode to charge the battery assembly. A good stored energy level may be determined with reference to the stored energy level or voltage of the battery assembly and may be set according to application requirements. When in the power output mode, power will be delivered from the apparatus to an external load.

During the charging mode, the apparatus is connected to an external power source so that the battery assembly can be charged by an external power source. When the apparatus is connected to the external power source, which is for example an AC mains supply, the AC-DC converter is to operate to output a DC power having a DC voltage. The DC power is a rectified version of the AC mains power and may not have a high enough voltage to charge the battery assembly. In order to have a charging power having a high enough charging voltage, the output of the AC-DC converter is connected to input of the DC-DC converter to supply DC power input to the DC-DC converter. The DC-DC converter upconverts the DC power input to output a DC power output having a high enough voltage suitable for charging the battery assembly. The BMS is configured to monitor charging of the battery assembly by the DC power output and will stop charging when the battery assembly has reached it maximum voltage or a percentage below the maximum voltage for longer operation life.

When in the charging mode, switches SW1 and SW3 are closed so that incoming power flows from the power source to the AC-DC converter, then to the DC-DC-converter and finally to the battery assembly. The BMS is configured to monitor conditions of the battery assembly from time to time and to repeatedly take and store battery parameter readings. Before charging of the battery assembly starts, the BMS is to retrieve data, for example, from a data storage on-board the apparatus. The data to be retrieved may include the voltage information of a battery module and the battery assembly, including the maximum voltage, the minimum voltage, battery charging schemes, and some or all of the battery parameters stored, to determine the actual charging scheme to promote safe charging and longer battery life. The BMS controller is configured to follow a predetermined charging pattern which is dependent on the type of batteries.

When in the non-charging mode, the BMS controller may stop operation of the AC-DC converter or may open SW1 to break the first switchable link.

Figure 2B:
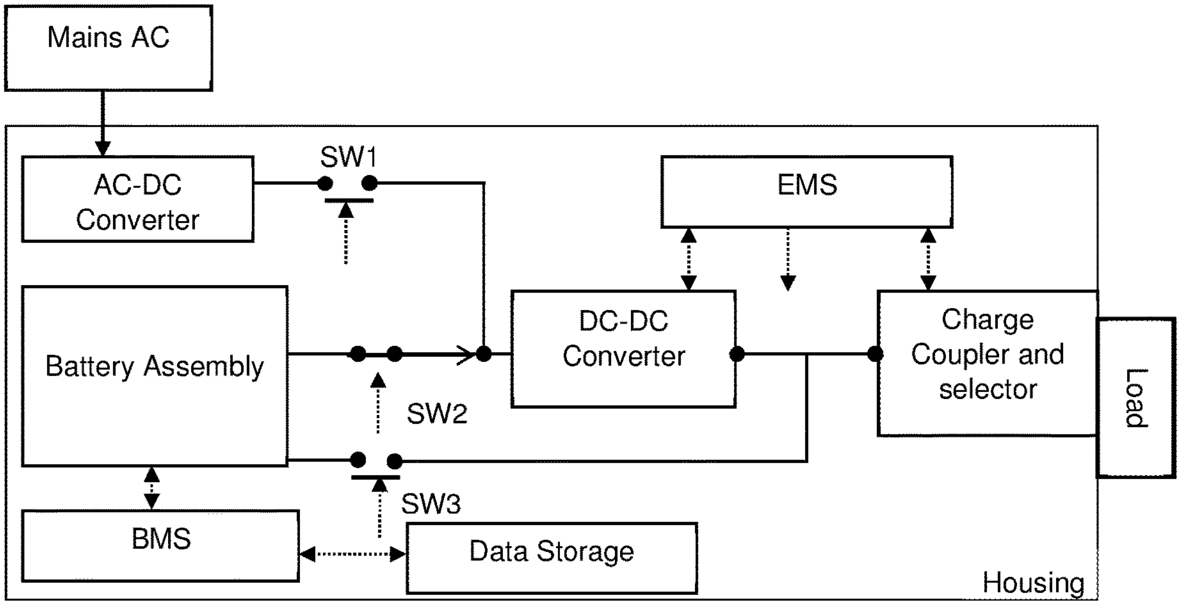
FIG. 2B is a schematic block diagram showing the apparatus connected to an external load.

When in the power output mode, the BMS controller will operate to close SW2 and open SW3 so that battery energy flows from the battery assembly to the DC-DC converter and then to a load connected to the output of the apparatus, as shown in FIG. 2B. When in the power output mode, SW1 may be opened or closed. When SW1 is closed, the output power would include power from the external power source if the apparatus is still connected to the external power source.

When in the output mode, the example battery assembly may output a maximum current of 100 A, although the actual current can be controlled, for example, by agreement between the EMS controller and counterpart controller.

When the power supply apparatus is connected to an external power source while in the charging mode, the power of the external power source may also be supplied to the DC-DC converter as a supplementary charging power by having both switches SW1 and SW2 closed. The first switchable link may include a diode or other unidirectional device which limits the flow of current in one direction, that is, from AC-DC converter to the DC-DC converter, and not in the reverse direction.

Modern-day mobile apparatuses are operated using different power supply systems and voltage rating, and the apparatuses are usually smart apparatus having an intelligent central controller having a communication frontend which is configured to data communicate with a counterpart controller, such as the EMS controller on-board the power supply apparatus, and to exchange data.

The controller of the power supply apparatus is configured to data communicate with a counterpart controller, such as a central controller of an electrical vehicle, and to exchange data.

When a load is connected to the charge coupler, the EMS controller is to establish data connection with the controller on-board the mobile apparatus and identify a correct protocol to communicate. Upon successful exchange of data, the EMS controller would learn from its counterpart controller, the charging standard, the charging schemes such as charging current and voltage, the SoC (state of charge) and other useful data for charging the on-board energy storage device, which is usually a battery assembly. Once the charging data and criteria, the EMS controller will operate to charge the on-board energy storage device of the mobile apparatus.

Figure 6A:
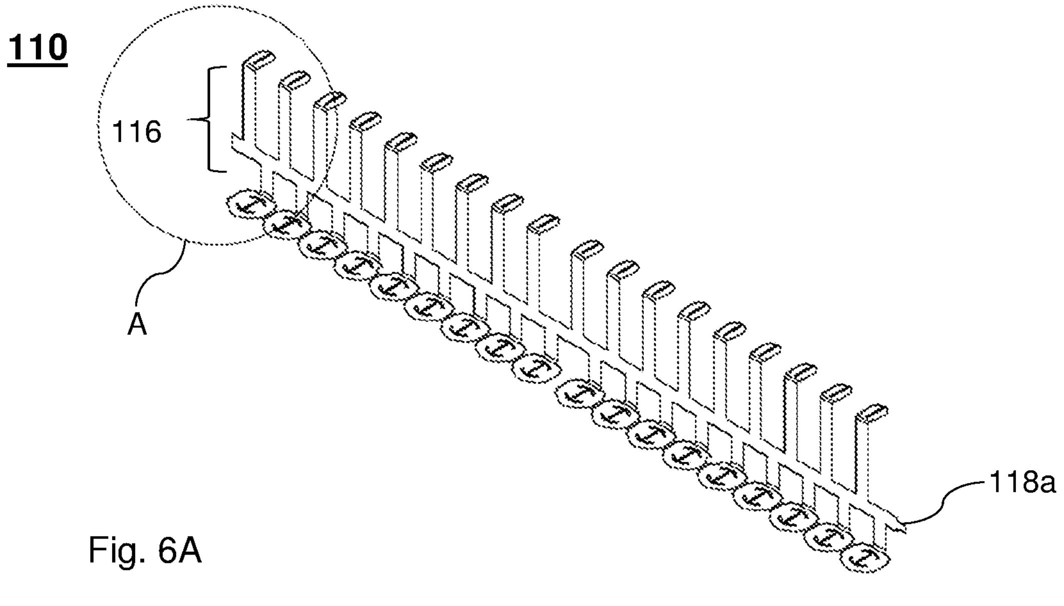
FIGS. 6A and 6B are, respectively, perspective and front views of an example inter-battery-row connector comprising an array of example inter-battery connectors.
Figure 6B:
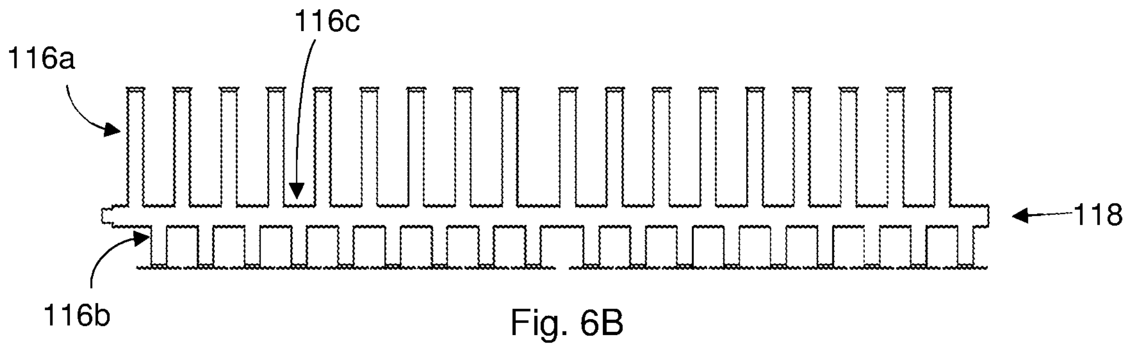
Figure 6C:
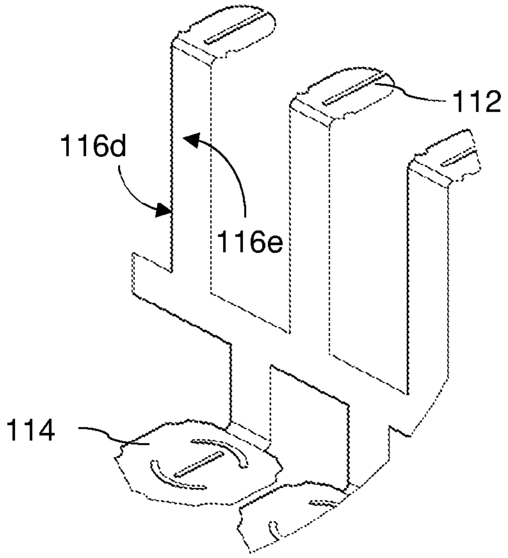
FIG. 6C is an enlarged view of the circled portion (A) of the inter-battery row connector of FIG. 9A.

In example embodiments, the external power supply is a single phase, 13 A, 50 Hz, AC supply at 220 V, as shown in FIG. 6A. The battery assembly has a maximum voltage of 403.2 V and a minimum voltage of 200 V. The second power converter comprises 2×14 kWh DC-DC converter. The DC-Dc converter is switchable to different output voltages, including charging voltage for the battery assembly and charging voltages conforming to different charging standards such as CHAdeMo, Combo+, Tesla, etc. The charge coupler may comprise different charge connectors (or "gun") which are configured for the different charging standards. Upon detecting the charging standard required and the charging voltage, the EMS controller will begin charging according to requirements of the standard of the connected load.

The DC-DC converter may be a MIMO (multiple-input multiple-output) DC-DC converter having a plurality of switchable inputs and/or a plurality of switchable outputs. The input and output voltage of the DC-Dc converter may be controllable, for example, digitally controllable by the EMS controller. While a plurality of power converters is shown in the example embodiments, the power converters may be integrated into a MIMO (multiple-input multiple-output) power converter without loss of generality.

For example, for a 100 V-battery module, the charging voltage may be set at 114.8 V, with a constant current (CC) charging rate at 11.475 A (0.5 C) up to 80%, then with a constant-voltage (CV) charging and to end charging when the charging current drops to 450 mA; or the charging voltage may be set at 117.6 V, with a constant current (CC) charging rate at 11.475 A (0.5 C) up to 90%, then with a constant-voltage (CV) charging and to end charging when the charging current drops to 4.5 A.

For example, for the 50 V-battery module, the charging voltage may be set at 57.4 V, with a constant current (CC) charging rate at 22.95 A (0.5 C) up to 80%, then with a constant-voltage (CV) charging and to end charging when the charging current drops to 900 mA; or the charging voltage may be set at 58.8 V, with a constant current (CC) charging rate at 22.95 A (0.5 C) up to 90%, then with a constant-voltage (CV) charging and to end charging when the charging current drops to 9 A.

In example embodiments, the power supply apparatus may comprise AC power output or a plurality of AC power outputs. To provide the AC power output, a DC-AC inverter or a plurality of DC-AC inverters is provided. The example power supply apparatus may include a 100-120 Vac 50 Hz output and a 200-240 Vac 50 Hz output.

An example battery module of the apparatus comprises an ensemble of battery units, monitoring and control circuitries, a ventilation means and a module housing. The ensemble of battery units typically comprises a plurality of battery units and the battery units are connected in series and in parallel to meet designed voltage and current requirements.

Figure 3A:
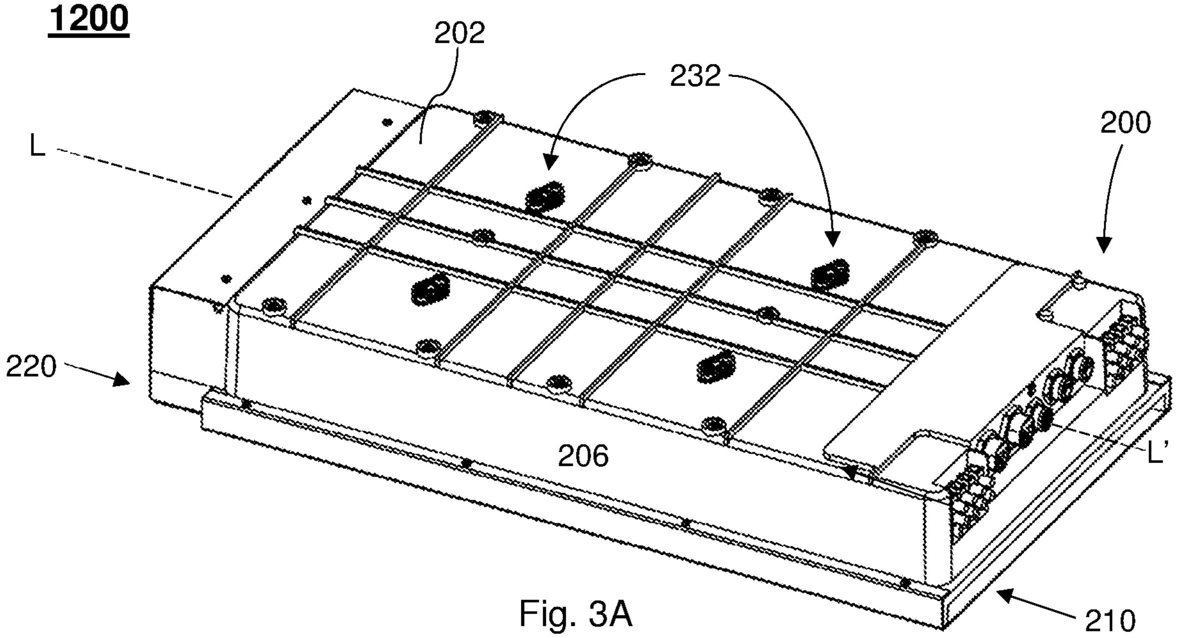
FIGS. 3A and 3B are perspective views of an example battery module.
Figure 3B:
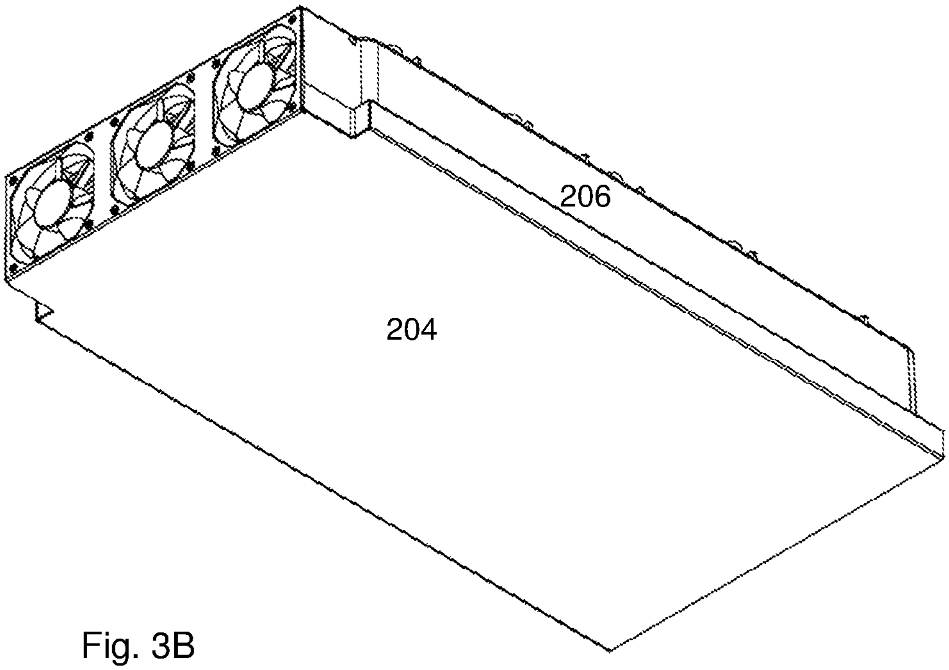
Figure 3C:
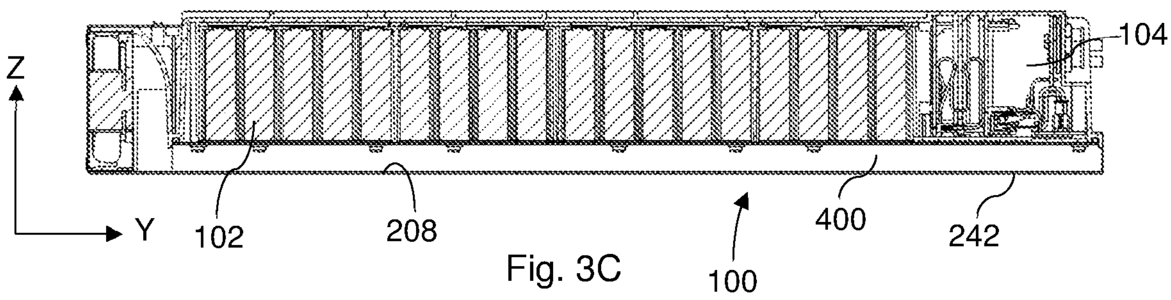
FIG. 3C is a longitudinal cross-sectional view of the power supply apparatus of FIG. 3A taken along the main longitudinal axis L-L'.
Figure 3D:
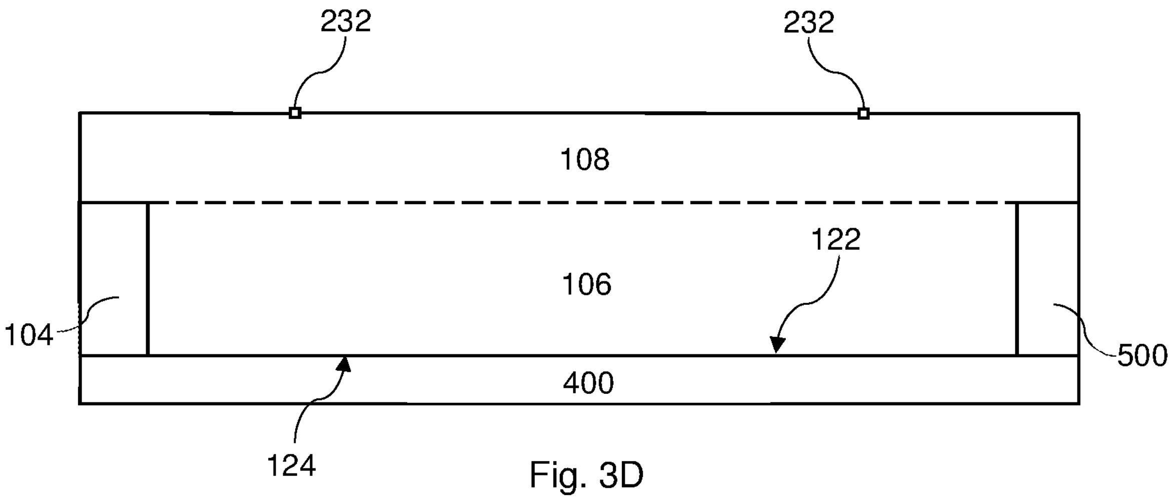
FIG. 3D is a schematic diagram showing example compartmental layout of the battery module.
Figure 3E:
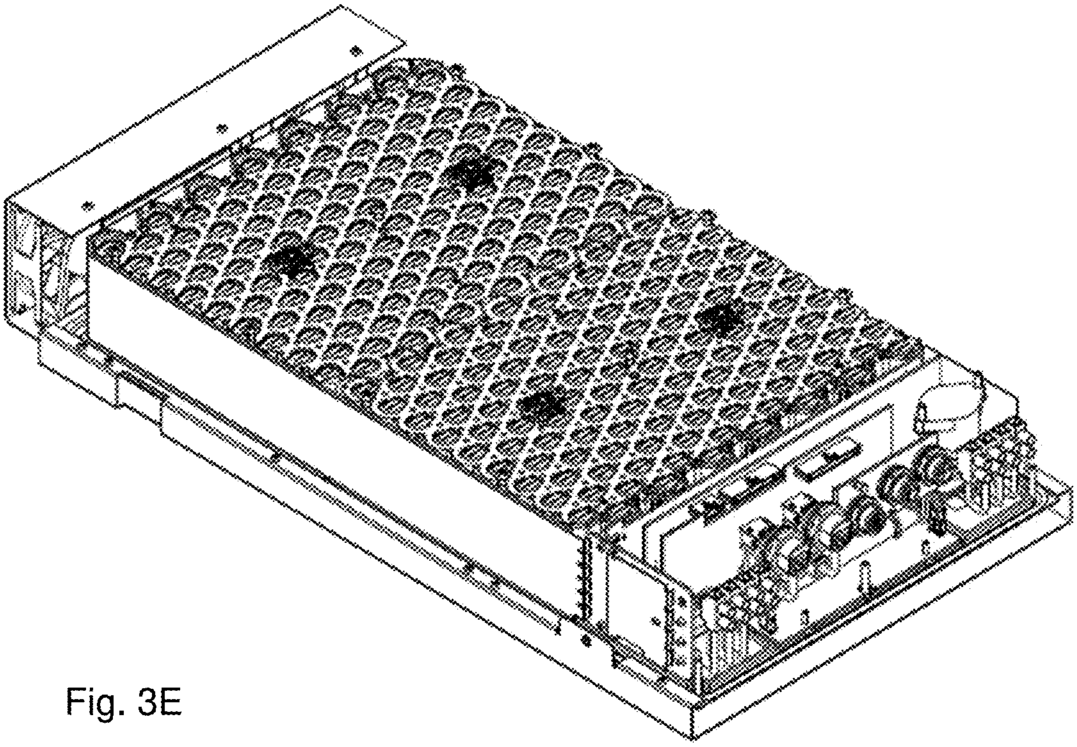
FIGS. 3E and 3F are exposed views of alternative example battery configurations of the battery module of FIG. 3A with upper module housing removed.
Figure 3F:
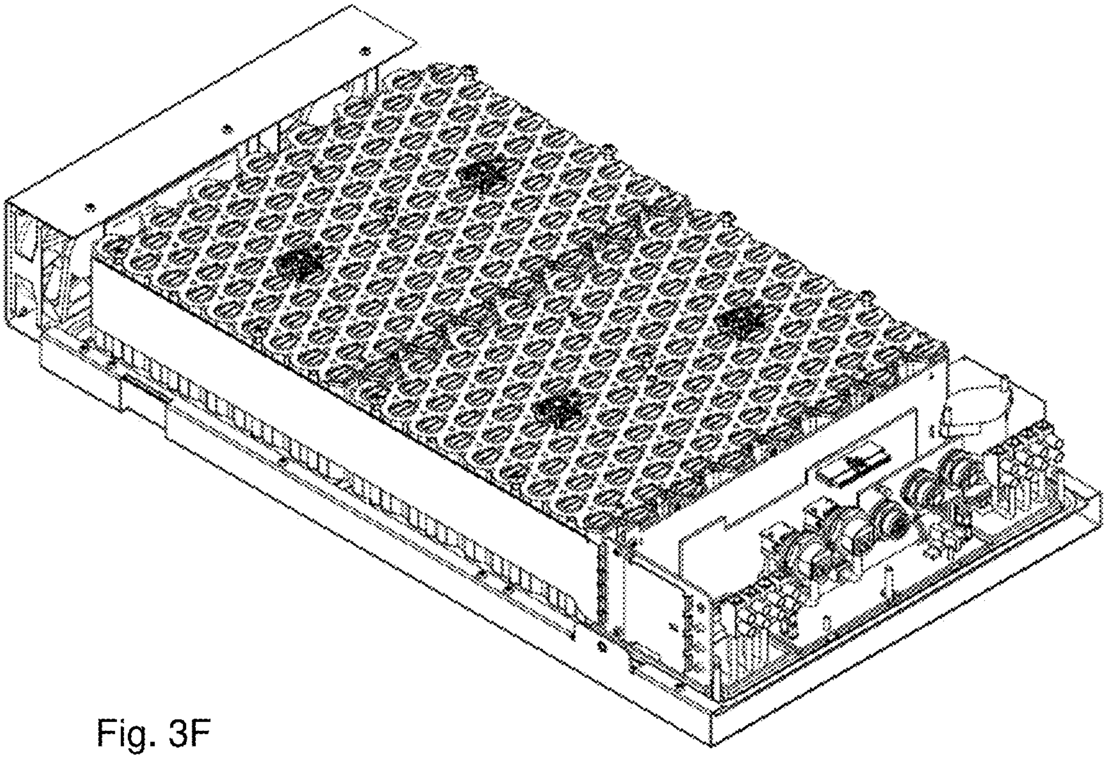
Figure 4:
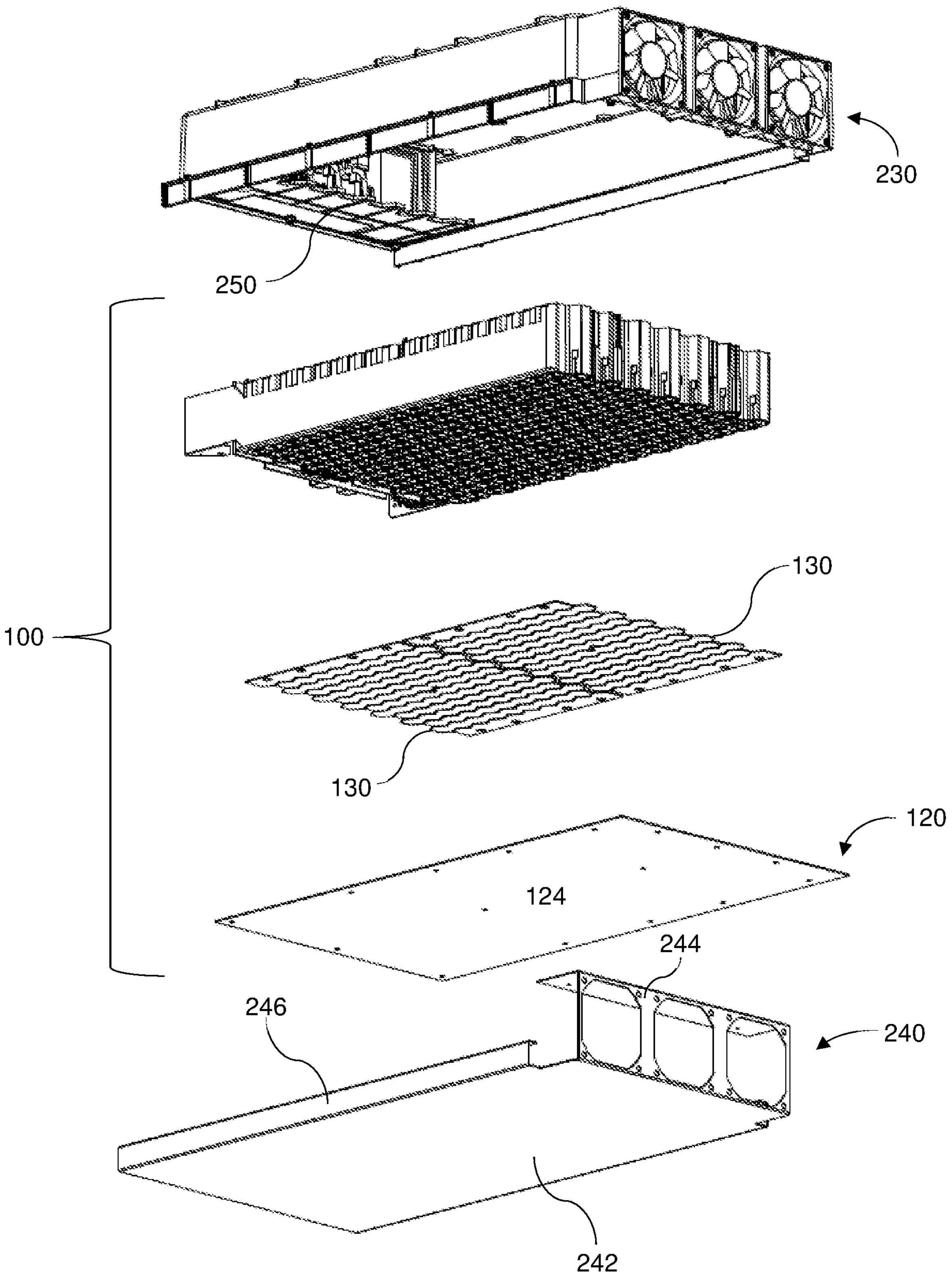
FIG. 4 is an exploded view showing example major components of the battery module.
Figure 5A:
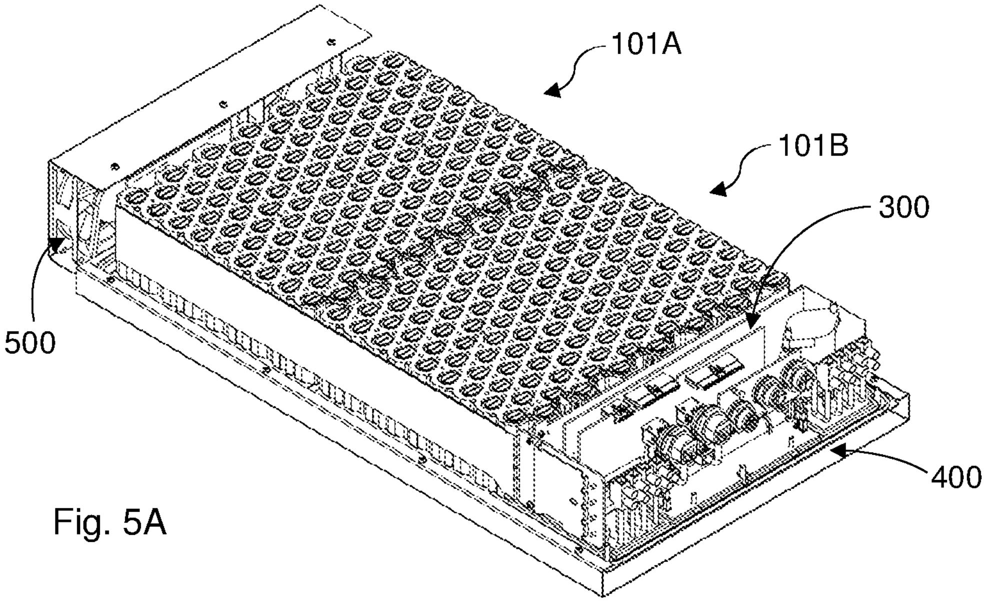
FIG. 5A is an exposed perspective view of the battery module.
Figure 5B:
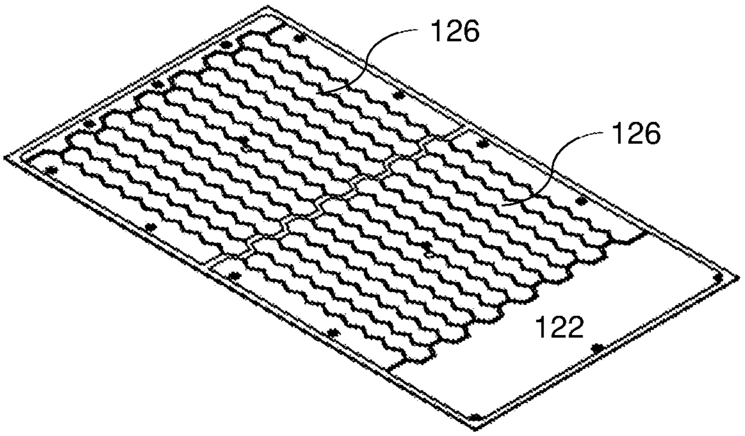
FIG. 5B is a perspective view of an example base plate showing heat conductive tracks.

An example module housing comprises a base housing portion and an upper housing portion which cooperate with the base portion to define, along a longitudinal direction defined by a longitudinal axis, a first compartment which is an electronics compartment in which electronic circuitries configured for control and monitoring conditions local to the battery module are installed, a second compartment which is a battery compartment in which the ensemble of battery units is received, and a third compartment which is a ventilator compartment in which an air-moving arrangement is installed. An example air-moving arrangement comprises a plurality of axial fans. The axial fans are arranged along a direction orthogonal to the longitudinal axis of the module housing, as shown in FIGS. 3E and 3F (in which the upper housing portions are removed), and the axes of the fans are parallel to the longitudinal axis.

The base housing portion and an upper housing portion cooperate to define an air channel having a first end which is an inflow end and a second end which is an out-flow end so that air coming in through the inflow end will exit through the outflow end after traversing the length of the channel. The electronics compartment is disposed on the inflow end and the ventilator compartment is disposed on the outflow end.

The electronic circuitries of the battery module may comprise sensors, sensing circuitries, switching circuities, switching control circuitries, control circuitries and peripheral circuitries such as a communication frontend. The sensors and sensing circuitries include, for example, temperature sensors, temperature sensing circuitries, voltage sensors, voltage sensing circuitries, current sensors, current sensing circuitries, pressure sensors and pressure sensing circuitries. The control circuitries of a battery module are control circuitries local to the battery module, and are referred to as a module management system or a pack management system (PMS), to distinguish from the BMS, which is an apparatus-wide management system.

In example embodiments, temperature sensors are placed on or inside the battery module, or more specifically inside the channel. In example embodiments, the control circuitries of the battery module are configured such that, when temperature of a battery module reaches a threshold temperature, the control circuities upon receipt of temperature signals from the sensor will activate the air-moving arrangement to move air out of the channel, whereby hot air is moved out of the battery module.

The battery modules are mounted such that the ventilator compartment is proximal and juxtaposes a vented surface of the main housing.

The example battery module is assembled from cylindrical battery units, for example, cylindrical battery cells having a dimension code 18650. Currently, lithium-ion rechargeable 18650 cylindrical batteries (for example, Panasonic™ model UR18650ZM2) are widely used.

In example embodiments, the battery units of a battery module are arranged into a configuration of nSmP, wherein n is the number of cells in serial connection and m is the number cells in parallel connection.

An example battery module comprises an example plurality of 252 pieces of 18650 lithium rechargeable cells, each having a current rating of 2550 mAh, a nominal voltage $V_{cell\ nominal}$ of 3.6 V, a voltage range of between 2.5 V ($V_{cell\ min}$) and 4.1 V ($V_{cell\ max}$), corresponding to a rated stored energy capacity of 2.3 kWh and a de-rated stored energy capacity 2.0 kWh. The example battery cell has an operating temperature range of between 0 and 45 degrees Celsius for charging and between −20 and 60 degrees Celsius for discharging.

In an example embodiment, the battery module is arranged into a configuration of 28S9P so that the battery module has a nominal voltage $nV_{cell\ nominal}$ of 100.8 V, a voltage range of between 70 V ($nV_{cell\ nin}$) and 114.8 V ($nV_{cell\ max}$), a maximum discharge current of 100 A, and a continuous output rating of 7 kW. The battery units are arranged into two serially connected groups, each having a 14S9P configuration and held on a crate comprising 14 rows and 9 cell receptacles per row. In the embodiment of FIG. 3E, the rows of the battery crates are parallel to the longitudinal axis of the module housing and the two groups are connected in series.

In an example embodiment, the battery module is arranged into a configuration of 14S18P so that the battery module has a nominal voltage $nV_{cell\ nominal}$ of 50.4 V, a voltage range of between 35 V and 57.4 V, a maximum discharge current of 100 A, and a continuous output rating of 3.5 kW. The battery units are arranged into two parallelly connected groups, each having a 14S9P configuration and held on a crate comprising 14 rows and 9 cell receptacles per row. In the embodiment of FIG. 3F, the rows of the battery crates are parallel to the longitudinal axis of the module housing and the two groups are connected in parallel.

The example battery module has a de-rated stored energy capacity of 2.0 kWh and a weight of 18.25 kg, corresponding to a de-rated energy storage density of higher than 0.1 kWh per kg (2 kWh/18.25 kg).

The example battery module has dimensions of 588 mm×315 mm×94 mm (length×width×height) and a volume of 0.0174 CBM, corresponding to a de-rated energy storage density of 115 kWh per CBM. The battery module has a de-rated energy storage density of more than 100 kWh or 110 kWh per CMB, which is advantageous, whether for road side rescue or for everyday charging.

The example battery module has an area of 0.185 square meter, corresponding to over 80% or 90% of the internal cross-sectional area (L×W) of the internal compartment of the main housing.

In example embodiments, the control circuitries of a battery module are configured to activate operation of the air-moving means to cause forced air flow through the channel when the temperature reaches a threshold temperature of 40 degrees Celsius and to stop operation of the air-moving means when the temperature drops to 40 degrees Celsius.

The battery modules are interconnected to form a power bank. A power bank herein is a power storage device in which power can be saved or deposited and from which power can be retrieved or withdrawn. Power herein means electrical power unless the context requires otherwise. The battery modules may be connected in series and/or parallel to form a battery assembly of a predetermined rated voltage and current.

In example embodiments, the battery units of a battery modules are arranged into a plurality of cell rows. Each cell row comprises a plurality of battery units. Adjacent battery units of the battery module are spaced apart and are separated by an air-gap. For example, a battery module having an nSmP battery cell configuration may be arranged into an example plurality of n cell rows or an example plurality of m cell rows. Adjacent cell rows of the battery module are spaced apart and are separated by an air-gap.

The battery units are held on a battery holder to maintain the battery units of a battery module in substantially fixed relative positions and substantially fixed relative spacings. An example holder comprises a grid of cell receptacles, each cell receptacle being configured for receiving a single battery cell. The grid of cell receptacles comprises a plurality of receptacle rows. Each receptacle row comprises a plurality of cell receptacles and has a row axis. Each cell receptacle (receptacle in short) defines a cell compartment and has a receptacle axis which is parallel to, for example co-axial with, the cell axis of a battery cell to be received. The row axis intercepts the receptacle axis and defines a row direction which is orthogonal to the receptacle axis in example embodiments such as the present. Each receptacle has a receptacle width, measured in the row direction and including the receptacle axis which is a centre axis of the receptacle. Each receptacle row has a row width which equal to the receptacle width multiplied by the number of receptacles forming the receptacle row. Each receptacle has a spacer arrangement which is configured to maintain a battery cell which is received inside the receptacle in a relatively fixed and stable position.

In example embodiments, the cell receptacle comprises a peripheral wall on which a plurality of axially extending ribs is formed as an example spacer arrangement. The rib of a receptacle extends in an axial direction and projects in a radial direction towards the receptacle axis. A rib herein may be a continuous rib or a broken rib. The radial extent of the rib is configured to maintain an air gap to surround the battery cell received inside the receptacle. The rib, and therefore the air gap, may have a radial extent of 0.5 mm to 1.5 mm or 2.5% to 8.5% of the diameter of the battery cell. In example embodiments, the peripheral wall of the receptacle has a hexagonal cross-sectional shape and the ribs project from corners of the hexagon defining the hexagonal cross-sectional shape. In example embodiments, the peripheral wall of the receptacle has a wall thickness of about 1 mm, say between 0.8 to 1.5 mm, or 4% to 8.5% of the diameter of the battery cell. A passageway parallel to the direction of the row is formed on the peripheral wall so that a portion of an intercell-connector can pass through the receptacle, for example, at a level between the top and the bottom of the receptacle. The passageway is off-set from and parallel to the row axis and the receptacle axis and traverses or extends through two immediately adjacent receptacle rows. In other words, each passageway is shared between two immediately adjacent receptacle rows. An example receptacle comprises a first slot and a second slot which cooperate to define a passageway. Each one of the first slot and the second slot is a slot formed on the peripheral wall which is shared with an adjacent row and is parallel to the receptacle axis. The first slot is also a slot on a first receptacle on that adjacent row and the second slot is also a slot on a second receptacle on the adjacent row which second receptacle is in abutment with the first receptacle.

In example embodiments, the peripheral wall of a receptacle is shared by three to seven receptacles. More specifically, the peripheral wall of a receptacle on an end row is shared by three or four receptacles, the peripheral wall of a first receptacle or a last receptacle on intermediate row is shared by four or five receptacles, and the peripheral wall of an intermediate receptacle is shared by six receptacles. An intermediate receptacle is one which is not on an end row or is not the first or the last receptacle of a row. An intermediate row is one which is not the first or the last row. In other words, the peripheral wall of an intermediate receptacle is shared by two receptacle rows which are immediately adjacent the intermediate row containing the intermediate receptacle. In example embodiments, immediately adjacent receptacle rows are off-set in the row direction so that a receptacle portion of one row is also a receptacle portion of another row. In other words, a portion of a receptacle is shared by or between two immediately adjacent receptacle rows.

The example hexagonal-shaped receptacle comprises a peripheral wall having six side walls, with two opposite-facing parallel side walls cooperating to define the receptacle width. The receptacle axis is intermediate the two parallel side walls and the parallel sides defining the two parallel side walls are orthogonal to the row axis. Two adjacent side walls of the hexagonal-shaped receptacle of the example embodiments, which interconnect the parallel side walls, are shared by two immediately adjacent receptacles of an immediately adjacent receptacle row. The two adjacent side walls are joined at a vertex of the hexagonal receptacle to form a V-shaped peripheral wall portion, and the vertex of the hexagonal receptacle is also a vertex of a hexagonal receptacle of an adjacent row. More specifically, the vertex is also an end of a parallel wall of a hexagonal receptacle of an adjacent row.

An example receptacle comprises a first slot and a second slot which cooperate to define a passageway. Each one of the first slot and the second slot is a slot formed on the peripheral wall which is shared with an adjacent row and is parallel to the receptacle axis. The first slot is also a slot on a first receptacle on that adjacent row and the second slot is also a slot on a second receptacle on the adjacent row which second receptacle is in abutment with the first receptacle.

In example embodiments such as the present, immediately adjacent receptacle rows are off-set or displaced by a half receptacle width in the row direction. The off-set or displacement in the row direction helps to enhance compactness of the battery module to increase battery cell density. The air gap surrounding each battery cell, which is defined by a plurality of thermally insulating ribs, mitigates battery cell heating in a high cell density environment.

The receptacles of a battery module may be formed on a battery crate or a plurality of battery crates. A battery crate may be integrally moulded of hard plastics such as ABS or PC (polycarbonate). Each battery crate may have an i,j configuration, comprising a plurality of i receptacle rows each comprising a plurality of j integrally moulded receptacles, i, j being natural numbers. An example battery module comprising an example plurality of i×j×k cells requires k crates to assemble. The plurality of crates may be connected side-by-side and/or end-to-end and serially or parallelly to form the batter module.

An example battery crate has an example plurality of i=14 rows, and each row has an example plurality of j=9 receptacles. An example battery module of 252 battery units can be assembled from two battery crates.

Where a crate has an i=n,j=m configuration, the cells in a row may be parallelly connected and adjacent rows serially connected to form an nSmP configuration. In such an arrangement, cell terminals of battery units of a first polarity are connected to a first interrow connector and cell terminals of battery units of a second polarity opposite to the first polarity are connected to a second interrow connector.

The battery units of the module are interconnected by a plurality of integrally formed connectors to form an nSmP configuration, n, m being natural numbers.

An example connector is an interrow connector which is configured to connect two cell rows in series. The interrow connector is an integral connector comprising a plurality of integrally formed terminal contacts which are configured to connect a first group of cell terminals of a first polarity of battery units of one row together with cell terminals of a second polarity of battery units of another row. The terminal contacts comprise a first group of contacts which is configured to connect the cell terminals of a first polarity of battery units of one row in parallel, and a second group of contacts which is configured to connect the cell terminals of a second polarity of battery units of another row in parallel. An example plurality of n−1 interrow connectors is required to form an ensemble of n cell rows.

An example interrow connector comprises a main portion and a plurality of branch portions which is joined to the main portion. The plurality of branch portions comprises a first group of branch portions which is configured to connect the cell terminals ("first group of cell terminals") of a first polarity of battery units of one row, and a second group of branch portions which is configured to connect the cell terminals ("second group of cell terminals") of a second polarity of battery units of another row.

The main portion extends along the row direction to interconnect the first group of branch portions and the second group of branch portions. The first group of branch portions is on one axial side of the main portion and the second group of branch portions is on another axial side of the main portion such that the main portion is intermediate the first group of branch portions and the second group of branch portions. The number of branch portions in each group of branch portions (that is, the first group or the second group) is equal to the number of cells in the one row or in the "another" row. Where there is m cells in a row, the group of branch portions for connecting to that row would normally have m branch portions.

Each branch portion comprises a cell contact terminal and a finger portion. The finger portion comprises a first end which is a proximal end joined to the main portion and a second end which is a distal end joined to the cell contact terminal. The cell contact terminal is configured for making physical and electrical contact with a cell terminal, the contact is usually a permanent contact, and has a contact surface area comparable to the exposed area of the cell terminal. The cell contact terminal projects away from the finger portion and extends at an angle to the finger portion to reach the cell terminal to contact. In example embodiments such as the present, the cell contact terminal is at 90 degrees to its finger portion. The cell contact terminals may be welded to the cell terminals by spot welding or other joining techniques without loss of generality.

The main portion of an example interrow connector comprises an elongate row conductor which extends in the row direction and extends through the passageways of a cell row. A first plurality of finger portions forming the first group of branch portions projects away from the main portion and extends towards a first axial end of the first receptacle to reach the first group of cell terminals. A second plurality of finger portions forming the second group of branch portions projects away from the main portion and extends towards a second axial end of the first receptacle to reach the second group of cell terminals. The first plurality and the second plurality are usually an equal plurality, but can be unequal. A finger portion of the first group of branch portions may project at a first angle to the row conductor so that the plurality of finger portions forming the first group of branch portions cooperates to form a grid of finger portions extending towards the first group of cell terminals. A finger portion of the second group of branch portions may project at a second angle to the row conductor so that the plurality of finger portions forming the second group of branch portions cooperates to form a grid of finger portions extending towards the second group of cell terminals. In example embodiments such as the present, both the first angle and the second angle equal 90 degrees so that the finger portions are orthogonal to the row direction.

The finger portions of the first group of branch portions may project at a same angle with respect to the row conductor so that the finger portions are parallel or substantially parallel.

The finger portions of the second group of branch portions may project at a same angle with respect to the row conductor so that the finger portions are parallel or substantially parallel.

The finger portion has a major surface which is parallel to the row direction and parallel to the receptacle axis.

In example embodiments, the finger portions belong to the same group of branch portions are at the same angle with respect to the row conductor, so that there is an air spacing between two immediately adjacent finger portions of the same group. The cell contact terminals of the first group of branch portions project in a first direction and the cell contact terminals of the second group of branch portions project in a second direction opposite to the first direction.

A cell contact terminal of the first group of branch portions is at a first axial level, a cell contact terminals of the second group of branch portions is at a second axial level, and a cell contact terminal of the first group of branch portions and a cell contact terminal of the second group of branch portions are separated by an axial distance which is equal to the axial length of the battery cell.

A cell contact terminal of the first group of branch portions and a cell contact terminal of the second group of branch portions are for making contact with cell terminals of opposite polarities on adjacent cell rows. Contact herein means both electrical and physical contact unless the context requires otherwise.

The interrow connector is mounted such that the row conductor is received in the passageway defined by a first cell row and a second cell row which is in abutment with the first row such that a finger portion of the first group of branch portions is in a first receptacle, which is a or any receptacle of the first row, and a finger portion of the second group of branch portion is in a second receptacle, which is a or any receptacle of the second row in abutment with the first receptacle.

A finger portion of the first group of branch portions of an interrow connector is inside a receptacle of the first cell row and extends in a first axial direction to reach a first axial end of the receptacle where a first cell terminal of a first battery cell having a first polarity is located. A finger portion of the second group of branch portions of the interrow connector is inside a receptacle of the second cell row and extends in a second axial direction to reach a second axial end of the receptacle where a second cell terminal of a second battery cell having a second polarity is located.

In example embodiments, the plurality of finger portions comprises a first group of finger portions which is configured to connect with cell terminals of a first polarity of one row of battery units and a second group of finger portions which is configured for connection with cell terminals of a second polarity of another row of battery units. The first group of finger portions projects in a first axial direction and the second group projects in a second axial direction opposite to the first axial direction.

In example embodiments, the row conductor is metal strip having a major surface which is parallel to the axial direction and the finger portions are substantially coplanar with the metal strip so that the row conductor and the finger portions cooperate to define a planar portion. In example embodiments, the major surface of the finger portion is parallel to or coplanar with the major surface(s) of the row conductor. The row connector is received inside the passageway and has a thickness comparable to or less than the width of the passageway, the width the passageway being measured in a direction orthogonal to the row direction and the receptacle axis. In example embodiments such as the present, the passageway has a width of about 1 mm, and may be in the range of between 0.8 mm and 1.2 mm.

The row conductor has a width which is slightly smaller than the length of the slots defining the passage way. The example row conductor has a thickness of between 0.1 mm and 0.2 mm, and may have a thickness range of between 0.1 mm and 0.6 mm. The example row conductor has a width of about 0.8 mm, and may have a width range of between 0.5 cm and 1.5 cm. The example finger portion has a width of about 0.7 mm, and may have a width range of between 0.5 cm and 1 cm. The finger portions are distributed along the row direction and are arranged in the form of a grating or a grid of finger portions.

The example interrow connector, or at least the row conductor and the finger portions, is integrally formed from a single metal sheet, for example, a copper sheet, a copper alloy sheet, or a steel sheet.

The row conductor and the finger portions cooperate to define an intermediate portion of the interrow connector. The intermediate portion of the example interrow connector has a configuration resembling the shape of a fish-bone and defines a grid of spaced apart finger portions. The intermediate portion has the form factor of a sheet and has a small thickness which is configured for fitting in a narrow interrow space between adjacent cell rows.

The example intermediate portion defines a network of connectors comprising a transversely extending row conductor and axially extending finger portions, and immediately adjacent finger portions are separated by an air gap to define an inter-digital spacing. The network of connectors defines a grid of connector portion which define an intermediate portion of the interrow connector. The intermediate portion extends in the axial direction and has an axial extent comparable to the axial extent of a battery cell of the battery module. In example embodiments where the cell battery is a cylindrical battery having a battery axis which is the cylindrical axis and having battery terminals of opposite polarity on opposite axial ends on a battery body, the intermediate portion has an axial extent comparable to or larger than the axial length of the battery body or the battery cell, the axial length being parallel to the battery axis and/or the receptacle axis.

The networked configuration of the intermediate portion, comprising an integral network of the row connector and the spaced-apart finger portions, define an interrow connector having a very low interrow resistance, thanks to the parallel connection of the finger portions, even though the intermediate portion has an axial extent comparable to the axial length of the battery cell.

The very low interrow electrical resistance, which is a series resistance between a pair of adjacent and abutting cell rows, is highly advantageous. For example, cell terminals of battery units of same polarity belonging to immediately adjacent or abutting cell rows can be at the same axial level, and it is not necessary to place some battery units upside down with respect to other cells in order to shorten the length of interrow connectors, and this would enhance reliability and durability of battery units as well as providing other advantages.

The very low interrow electrical resistance of the intermediate portion also means a very low thermal resistance. The very low thermal resistance means heat from battery units can be transported efficiently from the battery units to the intermediate portion for heat dissipation. An intermediate portion configurated in the form of gratings would function as a heat sink and an effective heat dissipator for fast dissipation of heat to mitigate over-heat risks. In other words, the example intermediate portion forms a partition of heat sink in the narrow interrow space. Such a configuration of the intermediate portion enhances compactness of the battery module as well as enhancing reliability and durability of the battery module.

Referring to FIGS. 3A to 9A, the battery module 1220 comprises a battery assembly 100, management circuitry and a main module housing 200 inside which the battery assembly 100 and the management circuitry 300 are received. The battery assembly 100 comprises a plurality of batteries 102 which are usually rechargeable batteries organized into a plurality of battery groups.

The housing 200 comprises a plurality of compartments, for example, a main compartment and a fan compartment, as depicted in FIG. 3. The main compartment is partitioned into a battery compartment 106 inside which the battery assembly 100 is received, a circuitry compartment 104 in which the management circuitry is received, an air compartment 400, and functional compartments which may be useful or beneficial. The fan compartment 500 is formed at a longitudinal end of the housing 200 and an air-moving arrangement is installed inside the fan compartment.

The housing 200 may be formed from metal parts, parts of strong plastics or a combination of both metal and strong plastic parts. The housing may comprise a plurality of housing portions. For example, the housing may comprise a main compartment housing portion and a fan compartment housing portion. The main compartment housing may be partitioned into a plurality of functional compartments.

The housing comprises a first housing portion ("first portion" in short), a second housing portion ("second portion" in short), and a peripheral housing portion ("peripheral portion" in short) interconnecting the first portion and the second portion. The first portion is on a first axial end and has an inward-facing major surface ("first major surface"). The second portion is on a second axial end and has an inward-facing major surface ("second major surface") which has a facing orientation directly opposite to that of the first major surface. The example housing 200 comprises a top portion 202 as an example first portion, a bottom portion 204 as an example second portion and a peripheral portion 206 interconnecting the top portion and the bottom portion which cooperate to define the main compartment housing. The peripheral portion extends in an axial direction Z between the bottom portion and the top portion to surround and define the main compartment. The peripheral portion has a first end which is a first longitudinal end 210 in this example and a second which is a second longitudinal end 220 in this example. The first longitudinal end 210 and the second longitudinal end 220 respectively defines a first longitudinal end and a second longitudinal end of the main compartment.

The first longitudinal end 210 and the second longitudinal end 220 are opposite longitudinal ends of the housing 200 are on a main longitudinal axis L-L' of the housing, which is also the longitudinal axis of the main compartment and which defines a main longitudinal direction Y of the apparatus. The axial direction Z of the peripheral portion defines a main axial direction of the apparatus which is orthogonal to the main longitudinal direction L.

The fan compartment housing portion is a longitudinal housing portion which projects away from the main compartment and extends in the main longitudinal direction of the main longitudinal axis L-L' to define the fan compartment.

The circuitry compartment is on a first longitudinal end 210 of the housing, the fan compartment is on a second longitudinal end 220 of the housing, and the battery compartment is intermediate the circuitry compartment and the fan compartment.

A plurality of peripheral devices is disposed on a front panel on the first longitudinal end 210 of the housing. The peripheral devices may comprise input, output and control interfaces including a power input, a power output, data interfaces, and user-interfaces.

The apparatus is configured as a power supply module such that the power supply module may operate as a standalone power supply or as a modular component of a plurality of power supply module forming a larger scale power supply.

The management circuitry comprises battery management circuitry and peripheral circuitry. The battery management circuitry may comprise battery charging control circuitry, battery discharge control circuitry, battery conditions monitoring circuity, battery safety control circuitry, and/or other useful circuitries. The peripheral circuitry may comprise metering circuitry, telecommunication circuitry including a data communication frontend, switching control circuitry, remote sensing circuitry, and other useful circuitries.

The example housing 200 comprises a first housing portion and a second housing portion which cooperate to form the housing. The example first housing portion is an upper housing portion 230 which comprises the top portion and the peripheral portion, and the example second housing portion is a lower housing portion 240 which comprises the bottom portion.

In example embodiments such as the present, the upper housing portion 230 is shaped and configured to define a battery compartment and is formed of a thermally insulating material, such as hard engineering plastics. The example upper housing portion is integrally formed form a strong engineering plastic material such as ABS and the battery compartment is a closed compartment except where venting apertures 232 are provided. In some embodiments, the upper housing portion may be of a thermally conductive material, for example, steel, aluminum or other metal. The upper housing comprises peripheral flanges which are complementary to peripheral flanges on the lower housing portion to facilitate quick assembly.

The example lower housing portion 240 is formed as a metal casing portion. The metal casing portion comprises a metal plate portion 242, a fan panel 244 on a longitudinal end, and peripheral flanges 246 extending along its sides. The metal plate portion defines the bottom portion of the housing as well as the floor 208 of the housing. The fan panel extends orthogonally to the metal plate portion and defines a plurality of fan apertures which is aligned with fans mounted on fan-mounting frame formed on the upper housing portion to permit through passage of air through the fans mounted in the fan compartment.

The portion of the metal casing portion 242 which forms the bottom portion of the housing is a stainless-steel plate which cooperates with the upper housing portion 230 to form the main compartment and the fan compartment which is adjacent to and in fluid communication with the air compartment.

The battery assembly 100 is mounted on the housing and held between the top portion of the housing and the air compartment.

The battery assembly 100 comprises a plurality of batteries which are electrically interconnected. Batteries of the battery assembly may be interconnected to form a plurality of parallel connected batteries and/or a plurality of serially connected batteries. The battery assembly may be arranged into one battery ensemble or a plurality of battery ensembles, and each battery ensemble is referred to as a battery group. A battery ensemble may comprise a plurality of batteries in parallel connection and/or a plurality of batteries in serial connection. The batteries of the battery assembly are electrically interconnected by a plurality of inter-battery connectors. A plurality of inter-battery connectors may be connected in series to form an inter-ensemble connector to connect an adjacent pair of battery ensembles.

The battery assembly may be arranged into one battery module or a plurality of battery modules. Each battery module comprises a plurality of parallel connected battery groups and/or a plurality of serially connected battery groups.

An example battery module comprises a first module portion having a first module surface which defines a first module end and a second module portion having a second module surface which defines a second module end. The example battery module has a top portion as an example first module portion and a top surface as an example first module surface which defines a top end as an example first end of the battery module. The example battery module has a bottom portion as an example second module surface and a bottom surface as an example second module surface which defines a bottom end of the battery module, and a peripheral portion which extends in an axial direction between the top end and the bottom end. The top end and the bottom end are opposite axial ends of the battery module. The axial direction of the example battery module is parallel to the battery axes of the batteries of the battery module. The axial direction of the example battery module is parallel to the main axial direction of the example housing, but may be at an angle or may be orthogonal to the main axial direction of the housing in some embodiments.

The battery module comprises a plurality of first battery terminal contact tabs 112 which are distributed on the first portion of the battery module to form an exposed first module surface and a corresponding plurality of second battery terminal contact tabs 114 which are distributed on the second portion of the battery module to form an exposed second module surface. A first battery terminal contact tabs is physically connected to a first battery terminal of a battery, for example by spot or laser welding. The first battery terminal of a battery has a first electrical polarity and a safety vent which is formed at or near the first battery terminal. The first battery terminal contact tab 112 has a slit or an aperture and is exposed to a discharge chamber which is intermediate the battery module and the first portion of the housing. The battery is held so that its safety vent is proximal to the first module surface and is unblocked by the first module surface so that hot gaseous discharge emanating from the battery can move freely from the first battery terminal to the first module surface and subsequently to the venting apertures 232 on the housing. The safety vent of conventional batteries is typically formed proximal to the positive terminal of the battery in which case the first battery terminal is a positive terminal of a battery and the second battery terminal is a negative terminal of a battery. Where the safety vent is proximal the negative battery terminal, the first battery terminal will be the negative terminal and the second battery terminal will be the positive terminal without loss of generality.

A second battery terminal contact tab 114 is physically connected to a second battery terminal of a battery, for example by spot or laser welding. The second battery terminal has a second electrical polarity which is opposite to the first electrical polarity. Where the first battery terminal is a positive terminal, the second battery terminal is a negative terminal and vice versa, The second module surface is an exposed module surface to facilitate physical and thermal connection with a thermal exchange device.

The peripheral portion of the battery module comprises a peripheral wall which surrounds the batteries of the battery module. The peripheral wall comprises a peripheral surface which extends in the axial direction to define the first portion and the second portion of the battery module.

The battery module is mounted on the housing such that its first surface is proximal to the first portion and distal from the second portion of the housing and such that its second surface is proximal to the second portion and distal from the first portion of the housing. The example battery module is mounted on the example housing such that its top surface is proximal to the top portion of and distal from the bottom portion of the housing and such that its bottom surface is proximal to the bottom portion and distal from the top portion of the housing.

The battery module is maintained at an axial level with respect to the first surface of the housing so that an axial separation is maintained between the first surface of the battery module and the first surface of the housing. This axial separation defines a discharge chamber so that gaseous discharge emanating from batteries of the battery module can exit from the module through venting apertures 232 on the first surface of the housing after travelling through the discharge chamber. This axial separation is selected to be relatively small to facilitate effective monitoring of extreme battery conditions. The axial separation distance may be approximately between 0.2 cm and 2 cm for the example battery arrangement, which is between 3% and 30% of the axial extent of a battery module of 18650 batteries. In general, the axial extent is selected to be at or larger than 3%, 5%, 7%, 9%, 11% and smaller than 20%, 25%, 30% of the axial extent of the battery module as a rule of thumb.

The venting apertures are in fluid communication with the discharge chamber and the number of venting apertures is significantly smaller than the number of batteries of the battery assembly. The example battery assembly has over 250 batteries but only four venting apertures. Each venting aperture is equipped with a thermal sensor and the thermal sensors are connected to temperature monitoring circuits of the battery management circuitry for monitoring temperatures of gaseous discharges of the battery assembly. In order that the temperature of hot gaseous discharge emanated from the batteries of the battery assembly does not drop significantly before reaching the thermal sensors, the discharge chamber, or more particularly the top portion of the housing is thermally insulated from the ambient to facilitate correct temperature monitoring. In this example, the first module surface is proximal to and directly facing the ceiling of the man housing, a plurality of venting apertures is distributed on the top portion of the housing, and the battery module is maintained at an axial level below the ceiling of the housing so that an axial separation is maintained between the top surface of the battery module and the ceiling of the housing. In some embodiments, the first module surface is proximal to and directly facing the floor of the man housing, a plurality of venting apertures is distributed on the bottom portion of the housing, and the battery module is maintained at an axial level above the floor of the housing so that an axial separation is maintained between the bottom surface of the battery module and the floor of the housing. Terms such as upper and lower, top and bottom, above and below are used for ease of reference with reference to how the module is configured during use and is not meant to be restrictive. For example, the module may be configured such that the battery axes which define the module axis are horizontal or at an angle to the vertical and the terms upper and lower, top and bottom, above and below should be construed accordingly and mutatis mutandis without loss of generality.

The example battery assembly comprises an example plurality of two battery modules 101A, 101B which are mounted side-by-side and in abutment for maximal compactness. The battery modules may be mounted spaced apart where compactness is not required. The example battery modules are mounted such that top surfaces of the component battery modules are aligned on the same axial level and facing the ceiling of the housing, the bottom surfaces of the battery modules are aligned on the same axial level and facing the bottom portion of the housing, and the peripheral portions are laterally aligned so that the battery assembly has a generally rectangular outline.

The battery assembly 100 comprises a base plate 120 which is mounted to the bottom ends of the battery modules (or mounted to the bottom end of the battery module where the battery assembly has a single battery module) to form a bottom end of the battery module. The base plate 120 partitions a portion of the housing into an upper portion which defines the battery compartment and a lower portion which defines the air compartment. The base plate is fastened onto a peripheral flange of the housing to form a substantially air-tight battery compartment except at the venting apertures. The peripheral flange extends along the inner peripheral of the housing and projects inwardly to form a sealing flange so that when in cooperation with the base plate and fasteners distributed along the peripheral flange forms a substantially air-tight battery compartment. The base plate is in physical and thermal contact with battery terminal tabs on the bottom end of the battery module but is electrically insulated from the battery terminal tabs.

The battery assembly is mounted on the housing and is maintained at an axial level above the floor of the housing. The floor of the housing is an inward-facing surface on the bottom portion of the housing.

The axial elevation of the battery assembly above the floor of the housing defines the axial extent of the air compartment. The axial extent of the air compartment is larger than the axial extent of the discharge chamber, for example, by 25%, 30%, 35%, 40%, or more.

The base plate 120 forms a bottom end of the battery module and has a major surface which faces away from the battery module and forms a bottom surface of the battery assembly. The air compartment is defined between the bottom surface of the base plate and the floor of the housing.

The battery assembly 100 comprises a thermal exchange arrangement which is to facilitate thermal exchange between the battery assembly and air inside the air compartment or ambient air. The thermal exchange arrangement comprises a thermal exchange device which is in thermal connection with the battery modules and which has a thermal exchange surface which is thermally exposed to the air compartment or the ambient air in embodiments where the housing has no air compartment so that heat exchange is with ambient air.

The example thermal exchange device of the present example comprises a thermally conductive plate having a thermal contact surface 122 that is thermally connected to the battery terminals of the battery assembly by means of a heat transfer network and which has a thermal exchange surface 124 which is exposed to air, for example air inside the air compartment or ambient air where there is no air compartment. The thermal contact surface and the thermal exchange surface are opposite-facing major surfaces of the thermally conductive plate.

The base plate 120 of the example battery assembly is a thermally conductive plate which is to function as a thermal exchange device in this example. To establish efficient thermal connection between the battery terminals and the base plate, the battery contact tabs exposed on the bottom portion of the battery modules are joined to an upper surface of the base plate by an electrically insulating thermal conductive medium such as a thermal conductive glue or preferably elastomeric thermal conductive sheets or thermal conductive strips 130 so that the base plate and the battery contact tabs are maintained in thermal connection but in electrical isolation from each other. For operations where the thermal exchange arrangement is to prevent overheating of batteries of the battery assembly, the upper surface of the base plate is for collecting heat from the batteries of the battery assembly and is therefore a heat collection surface while the lower surface of the base plate is a heat discharge surface for dissipating heat into the air compartment. For operations where the thermal exchange arrangement is to warm up the batteries of the battery assembly to their operation temperature range, the operation reverses such that the lower surface of the base plate becomes a heat collection surface to collect heat from the air compartment and the upper surface of the base plate becomes a heat discharge surface for dissipating heat into the batteries.

The air compartment is an air chamber which is in fluid communication with the fan compartment on one longitudinal end and in fluid communication with ambient air on another longitudinal end which is distal to the fan compartment. So that ambient air can be freely drawn into the air compartment for thermal exchange, the circuitry compartment has a lower surface 250 which is substantial flush with the base plate to form a through air-passageway between the first longitudinal end of the housing and the entrance to the air compartment.

In example embodiments such as the present, the base plate 120 is physically and thermally connected to battery contact tabs on the bottom surface of the battery module to ensure good thermal contact and good thermal connection between the battery module and the base plate. The example base plate 120 is a metal plate having a plurality of contact tracks 126. The contact tracks are an integral part of the metal plate and adjacent contact tracks are isolated and insulated. Each track is thermally connected to a row of batteries by means of a corresponding shaped thermal connector strip 130. An example base plate is formed from a composite base board having a composite structure similar to the structure of a composite board for forming a printed circuit board, except that the base board has an insulted layer formed on a metal substrate rather than a metal layer formed on an insulator substrate. The example base plate has an aluminum plate substrate and an electrical insulating coating on the plate substrate. The contact tracks may be formed by masked imprinting and etching so that the contact tracks remain and appear as printed metal tracks on a metal substrate after masked removal of the insulating layer on top. The thermal contact tracks are mutually isolated and mutually insulated tracks. Adjacent contact tracks are separated by and/or surrounded by insulating tracks which form insulating gaps. Each track is elongate and has a zig-zag profile on each of its long edges to follow the zig-zag outline of battery compartments forming a battery receptacle row. The example zig-zag profiles on the long sides of an example contact track are symmetrical about a longitudinal axis of the contact track, which is also a center axis of the contact track. The base plate is to function as a heat sink to sink heat which is built-up or developed in the battery assembly and to function as a heat dissipator to dissipate heat into the air compartment. To enhance heat dissipation rates, heat dissipating protrusions, such as fins or distributed protrusions may be formed on the underside of the base plate. The underside of the base plate is a thermal exchange surface of the base plate which is exposed to the air compartment and which is in thermal contact with air inside the air compartment or ambient air. The thermal exchange surface is to function as a heat dissipation surface when arrange to dissipate heat from the battery compartment.

The metal plate which forms the bottom portion of the housing further helps to enhance heat dissipation rate.

The example thermal connector strip may be an elastomeric thermal connector, for example, an elastomeric thermal connector made of a non-silicone thermal interface material. products of the F-CO™ series available from Furukawa are an example of thermal conductive medium suitable for this purpose.

In the present example, battery contact tabs forming the top surface of the battery assembly are contact tabs which are physically joined to positive battery terminals of batteries of the battery assembly, and battery contact tabs forming the bottom surface of the battery assembly are contact tabs which are physically joined to negative battery terminals of batteries of the battery assembly. The battery contact tabs may be physically joined by spot welding, laser welding or other metal joining techniques.

The base plate is thermally mounted to the negative battery terminals through battery contact tabs on the bottom surface of the battery module to take advantage of the larger end surface area of a negative battery terminal of a cylindrical battery (compared to the end surface area of a positive battery terminal) to enhance better thermal dissipation from the batteries to the base plate, which is to function as a heat sink or heat dissipating surface in the example embodiment.

In the example module, the top and peripheral portions of the housing cooperate with the base plate to define the battery compartment, and the bottom portion of the housing cooperate with the base plate to define the air compartment. The battery compartment is a closed compartment having the venting apertures as the only air outlets so gaseous discharge from the battery assembly can only exit from the venting apertures which are on the top portion of the housing. The air compartment is preferably a closed chamber having an air inlet on one longitudinal end and an air outlet on the other longitudinal end so that ambient air drawn into the air compartment has to travel along the entire span of the air compartment for good thermal exchange.

An array of electrical fans is mounted on the fan compartment housing to form an example air-moving arrangement. The array of fans extends transversely to the longitudinal axis and comprises an example plurality of three axial fans and the fan axes are parallel to the longitudinal axis of the housing. The fans are arranged to move air out of the air compartment through the axial fans and to draw ambient air into the air compartment. In example embodiments, ambient air inlets are formed on a longitudinal end of the housing which is distal to the fan compartment so that incoming ambient will traverse the entire length of the base plate before reaching the fan compartment to exit. In some embodiments, ambient air inlets may be formed on sides of the housing which defines the air compartment.

During operations of the air-moving arrangement, air inside the fan compartment is drawn out of the fan compartment and exits from the module through the fans. As a result, a low-pressure region is formed inside the fan compartment, and air inside the air compartment will be drawn into the fan compartment due to pressure differences. As a result of movement of air from the air compartment into the fan compartment, a low-pressure region is formed inside the air compartment and ambient air will be drawn from outside of the module into the air compartment to replenish the loss of air from the air compartment.

The contact between the base plate and air inside the air compartment will result in thermal exchange between the base plate and air in the air compartment, and movement of air across the air compartment to the ambient will result in transport of heat resident in the air of the air compartment to outside of the module.

When heat carrying air is moved across the air compartment and subsequently moved out of the module, the air compartment will be replenished with newly drawn air of a lower temperature, for example, at ambient air temperature, and continuation operation of the heat exchange and removal process by operation of the air-moving arrangement will hopefully cool down the battery assembly rapidly to prevent adverse and contagious heat built-up inside the battery assembly and prevent catastrophic battery meltdown.

The thermal exchange device is configured to collect heat from batteries, and more specifically from interior of batteries, of the battery assembly. To facilitate collection of heat from interior of the batteries, a heat collection and transfer network (heat transfer network in short) which thermally interconnects the electrodes of the batteries and the thermal exchange device is provided. The example heat transfer network comprises heat collection terminals which are integrally connected to the first battery terminals of the batteries. Since the first battery terminal of a battery is always a good conductor of both heat and electricity which is directly or integrally joined with a battery electrode to minimize resistance, a heat transfer network having heat collection terminals which are in good thermal connection with the battery terminals would facilitate efficient and rapid extraction of heat from the interior of the batteries for dissipation to the ambient when the heat transfer network is thermally connected to the ambient, for example, by means of a thermal exchange arrangement.

The example heat transfer network comprises a plurality of inter-battery connectors of the battery assembly. An example inter-battery connector comprises a first battery terminal contact tab 112 ("first contact tab" in short), a second battery terminal contact tab 114 ("second contact tab" in short) and an inter-terminal tab 116 which interconnects the first contact tab and the second contact tab. The first contact tab is for connection to a first terminal of a battery, the second contact tab is for connection to a second terminal of another battery which is in adjacency, and the inter-terminal tab is an inter-battery link which interconnects a pair of adjacent batteries.

An example inter-battery link comprises a first link portion 116*a*, a second link portion 116*b* and an intermediate link portion 116*c* interconnecting the first link portion and the second link portion. Each link portion is a tab portion having geometry of a tap. A tab has a major surface 116*d* which is a flap surface, and the major surface of a tab has an area which is significantly larger than (for example, 5 times, 10 times, 15 times, 20 times or more as a convenient example) the area of its minor surface 116*e*. The terms tab and flap have same technical meaning herein and are interchangeably used.

The first link portion (or the first battery unit connector) comprises a first metal flap portion which integrally interconnects the first contact tab and the intermediate metal flap portion, and the first contact tab projects away from the first metal flap portion in a first projection direction. The second link portion (or the second battery unit connector) comprises a second metal flap portion which integrally interconnects the second contact tab and the intermediate metal flap portion, and the second contact tab projects away from the second metal flap portion in a second projection direction which is opposite to the first projection direction. The first contact tab and the second contact tab are parallel and are separated by an axial separation distance equal to the axial height of one of the batteries being connected. The first metal flap portion and the intermediate metal flap portion are integrally joined and have major flap surfaces which are coplanar. The second metal flap portion and the intermediate metal flap portion are integrally joined and have major flap surfaces which are coplanar. Portions are integrally joined or integrally connected if they are joined together by fusion welding or if there formed from a single piece of material as a convenient example.

In example embodiments such as the present, batteries of a battery module or a battery assembly are organized into a plurality of battery groups and an adjacent pair of battery groups is interconnected in series by inter-battery-group connector.

In example embodiments such as the present, a battery module comprises a plurality of battery groups arranged into a plurality of battery rows. Each battery row comprises a plurality of batteries in parallel connection and the battery rows are connected in series.

A battery row and an adjacent battery row which form a pair of battery rows of the battery module are interconnected by an inter-battery-row connector 110 ("inter-row connector" or "intergroup connector" in short). The inter-row connector comprises an array of inter-battery connectors and the inter-battery connectors forming the array are distributed in a row direction to form a series of inter-battery connectors.

The inter-row connector comprises a first connector portion, a second connector portion and a third connector portion. The first connector comprises an array of first contact tabs, the second connector portion comprises an array of second contact tabs and the third connector portion comprises an array of inter-terminal tabs. The first contact tabs which form an array of first contact tabs are distributed along the row direction and adjacent first contact tabs are separated by an air gap. The second contact tabs which form an array of second contact tabs are distributed along the row direction and adjacent second contact tabs are separated by an air gap. The inter-terminal tabs forming the array of inter-terminal tabs are interconnected at their intermediate link portions to form an inter-terminal link which interconnects the array of first contact tabs and the array of second contact tabs and an array of inter-terminal tabs. The first tabs and the second tabs project in opposite projection directions and has contact surfaces which are orthogonal to the row direction.

The inter-row connector comprises a plurality of first metal flap portions which are distributed along a row direction to form a row of first metal flap portions, a plurality of second metal flap portions which are distributed along the row direction to form a row of second metal flap portions, and a plurality of intermediate metal flap portions which are distributed along the row direction to form a row of intermediate metal flap portions. The first metal flap portion and the second metal flap portion are respectively the first link portion and the second link portion in this example.

The first metal flap portions of an example inter-row connector are distributed along the row direction to form a plurality of metal flaps which extends orthogonally to the row direction between the intermediate metal flap portions and the first contact tabs.

The second metal flap portions of the example inter-row connector are distributed along the row direction to form a plurality of metal flaps which extends orthogonally to the row direction between the intermediate metal flap portions and the second contact tabs.

The first metal flap portions and the second metal flaps are alternately disposed in the row direction so that a first metal flap portion is intermediate a pair of adjacent second metal flap portions and a second metal flap portion is intermediate a pair of adjacent first metal flap portions.

Adjacent first metal flap portions of an inter-row connector are separated by an interdigital separation distance and the interdigital separation distance between immediately adjacent first metal flap portions of an interrow connector are uniform wherein the width of the first metal flap portion is uniform. The interdigital separation distance of the first metal flap portions of an inter-row connector is dependent on the width of the second metal flap portions and may be comparable to or larger than the dimension of the battery in the row direction.

Adjacent second metal flap portions of an inter-row connector are separated by an interdigital separation distance and the interdigital separation distance between immediately adjacent second metal flap portions of an inter-row connector are dependent on the separation distance of adjacent batteries and are uniform wherein the width of the second metal flap portion is uniform. The interdigital separation distance of the second metal flap portions of an inter-row connector is dependent on the width of the second metal flap portions and may be comparable to or larger than the dimension of the battery in the row direction.

The first metal flap portions and the intermediate metal flap portions cooperate to form a first metal grating. The second metal flap portions and the intermediate metal flap portions cooperate to form a second metal grating. The first metal flap portions, the second metal flap portions and the intermediate metal flap portions cooperate to form a main metal grating. Each of the metal gratings may be flexible and may be exposed so that its major surfaces are non-thermally insulated and non-electrically insulated. The intermediate metal flap portions of an inter-row connector are integrally connected to extend along the row direction to define the dimension of the inter-row connector in the row direction.

The example inter-row connector comprises an elongate row tab 118 which is a row link extending in the row direction to interconnect the first metal flap portions and the second metal flap portions of the inter-battery connectors forming the inter-row connector.

The metal flap portions have major flap surfaces which are parallel to the row direction.

An example inter-row connector is formed from a single flexible metal sheet and comprises a plurality of flexible tab portions.

Figure 7:
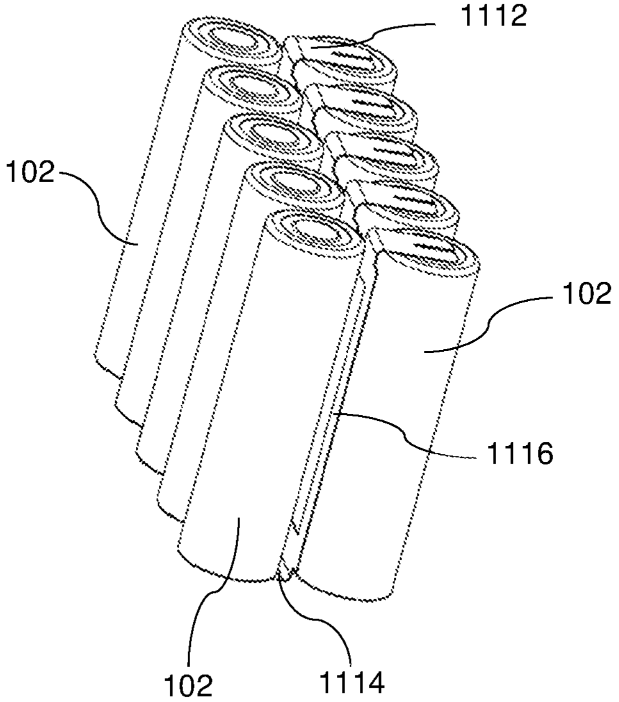
FIG. 7 shows interconnection of two rows of batteries by an example inter-row connector.

Another example inter-row connector is shown in FIG. 7. An adjacent pair of rows of batteries, consisting of two rows of batteries, are connected in series by the inter-row connector. Each inter-row connector comprises a plurality of N inter-battery connectors and each inter-battery connector comprises a first battery terminal contact tab 1112, a second battery terminal contact tab 1114 and an inter-terminal tab 1116 which interconnects the first battery terminal contact tab 1112 and the second battery terminal contact tab 1114. A window or aperture, which extends for a substantial portion of the axial length of the inter-battery connector is formed on the inter-terminal tab 1116.

To assemble a battery row of batteries in parallel, an inter-row battery connector is attached to a plurality of batteries forming a battery row, and the modular members are fitted together to form a sub-assembly. When the battery row is assembled, the first battery terminal contact tab 1112 is on a first axial end of the battery receptacle and in physical and electrical contact with the first battery terminal, the second battery terminal contact tab 1114 projects from the second end of the battery receptacle and extends into another row for making physical and electrical contact with the second battery terminal of a battery in another row, and the inter-terminal tab 1116 extends axially inside the battery receptacle between the first axial end and the second axial end of the battery receptacle of the battery having its first terminal connected with the first battery terminal contact tab 1112.

An example battery module comprises a battery tray 140 (or tray in short), a plurality of batteries 160 held on the battery tray and a plurality of inter-row connectors interconnecting the batteries. The inter-row connector is for connecting battery terminals of batteries in one receptacle row with battery terminals of batteries of an abutting adjacent receptacle row. In example embodiments, where a battery module has a plurality of M receptacle rows, there is a corresponding plurality of M inter-row connectors.

Where an adjacent pair of receptacle rows of a battery module has a plurality of N battery receptacles, the inter-row connector comprises a plurality of N inter-battery connectors which are interconnected by a row link. Each inter-battery connector comprises a first contact tab, a second contact tab and an intermediate link which interconnects the first contact tab and the second contact tab. As the first contact tab and the second contact tab are terminal contact tabs for connecting to different batteries, the intermediate link is also an inter-battery link. A contact tab herein is a battery terminal contact tab unless the context requires otherwise. An example first contact tab is for connection to a first terminal of a battery of a receptacle row and an example second contact tab is for connection to a second terminal of a corresponding battery on an adjacent receptacle row. The example first contact tab projects away from the intermediate link and extends away, for example, orthogonally away, from the adjacent receptacle row. The example second terminal projects away, for example, orthogonally away from the intermediate link and extends away from the first contact tab. The first contact tab and the second contact tab are parallel and has an axial separation equal to or comparable to the length, axial extent, or height (which is 65 mm for an 18650 sized battery) of the cylindrical battery. The example intermediate link is an elongate metal flap having major surfaces which are parallel to the row direction of the receptacle row and which are parallel to the battery axes of the corresponding batteries which the inter-battery connector connects. The metals flaps forming the intermediate link extends in an air gap between the first and second terminals of the corresponding batteries. Because the contact tabs are in physical and electrical connection with the battery terminals of the corresponding batteries, heat built up in the batteries will be transferred to the inter-row connector and then to the base plate. The inter-row connector is configured to have a high surface area to volume ratio and is made of a good thermal and electrical conductor to enhance heat transfer to the base plate and good heat dissipation. The base plate and the interrow connectors are configured to form a heat transfer network whereby heat generated by batteries of the battery module is transferred to the base plate through the inter-row connectors. The heat transfer network comprises a thermal transfer matrix comprising rows of thermal conductive flaps which are thermally joined with the base plate. The thermal conductive flaps extend in an axial direction along the length of the batteries.

To promote efficient transfer of heat from interior of batteries of the battery assembly to the base plate for subsequent dissipation into the air compartment, the second contact tab, which is permanently joined to the base plate by a heat transfer interface medium, has dimensions comparable to, equal to or slightly larger than the second terminal of the battery in contact.

The example inter-row connectors of the present disclosure are configured to have a high surface area to volume ratio to function as a good heat dissipator.

A battery tray 140 of the present disclosure comprises a plurality of battery receptacles 142 for holding a corresponding plurality of batteries, so that each battery has its own battery receptacle. The battery receptacles of a battery tray are organized into a plurality of M receptacle rows. Each receptacle row (or row in short) comprises a plurality of N battery receptacles and extends along a receptacle row axis which defines a receptacle row direction X. Each battery receptacle has a receptacle axis, which is a center axis of the battery receptacle defining an axial direction of the receptacle. The receptacle row axis of a receptacle row is formed by joining the receptacle axes of the battery receptacles of that receptacle row. The battery receptacles forming a receptacle row are distributed along the receptacle row axis of the receptacle row between a first row-end and a second row-end. The first row-end is a first lateral end on which a first end-receptacle (or first receptacle) is located and the second row-end is a second lateral end of the receptacle row on which a second end-receptacle (or last receptacle) is located.

The battery tray comprises a plurality of immediately abutting receptacle rows and the immediately abutting receptacle rows are parallel to each other. The receptacles rows forming a battery tray are distributed in a distribution direction Y. The distribution direction may be orthogonal to the receptacle row direction X, but can be an angle to the receptacle row direction. The receptacle rows may be distributed so that spacings between immediately adjacent receptacle rows, which are abutting adjacent receptacle rows, are same or uniform. The receptacle rows forming a battery tray may have same number or different numbers of battery receptacles.

Figure 8A:
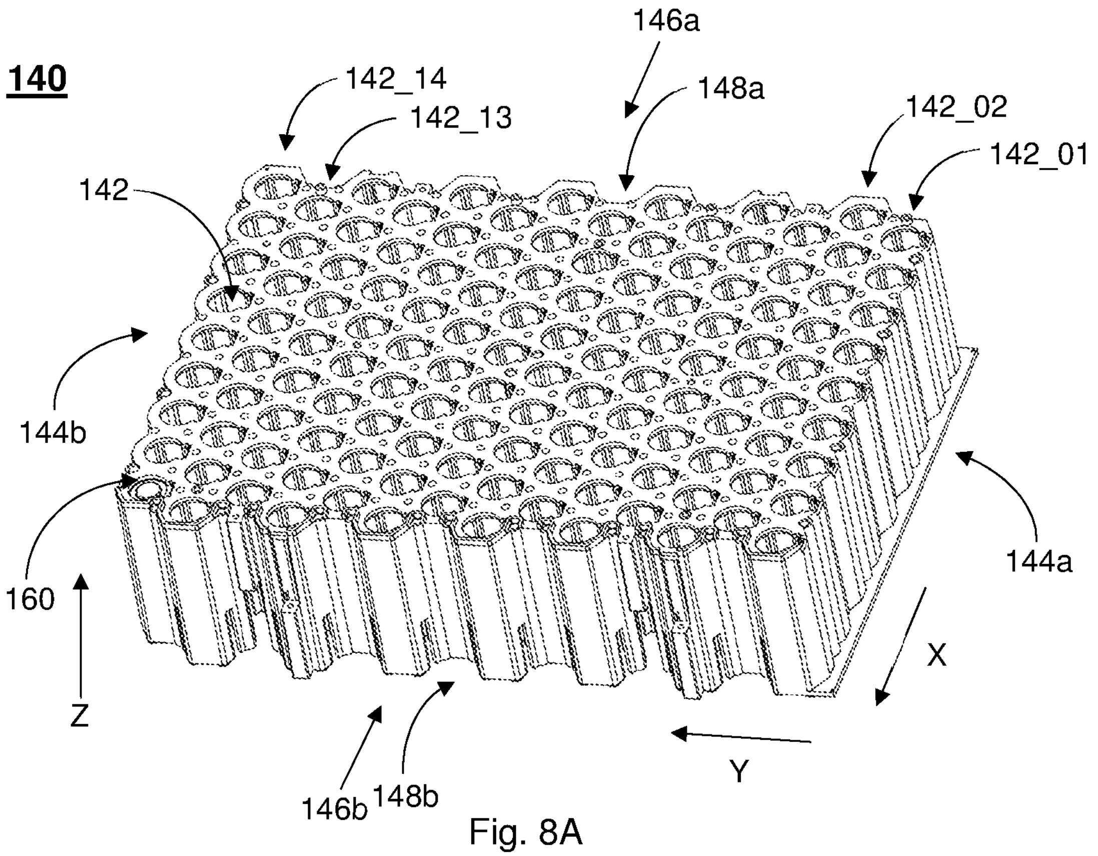
FIGS. 8A and 8B are perspective views of an example battery tray of the power supply apparatus.
Figure 8B:
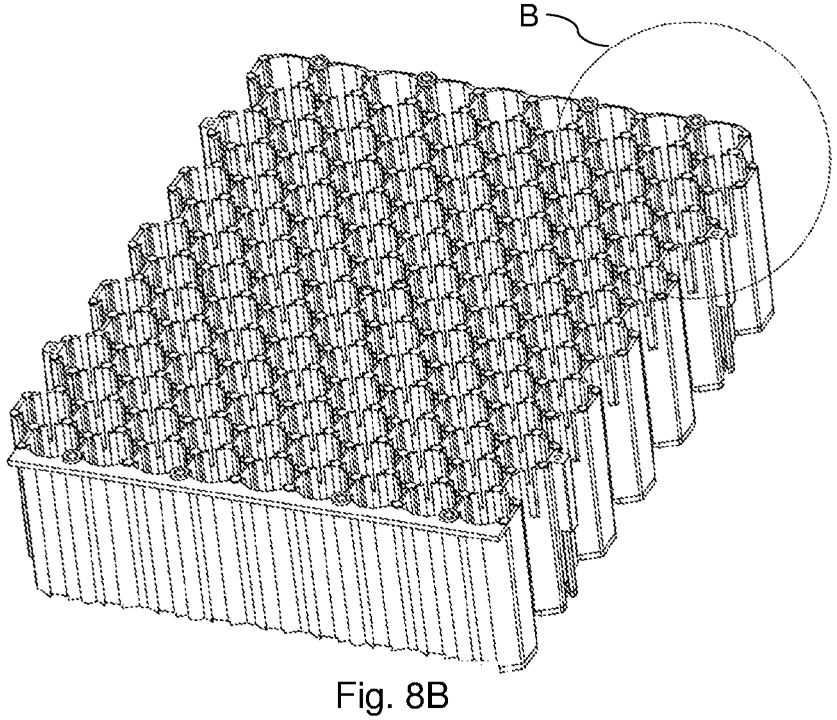
Figure 8C:
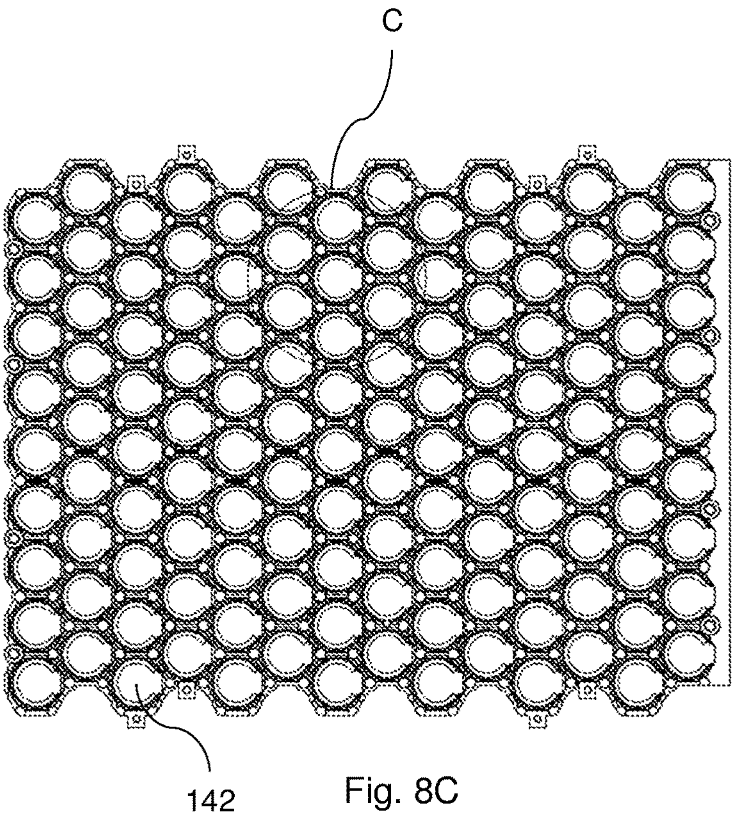
FIG. 8C is a plan view of the battery tray of FIG. 8A, FIGS. 8D and 8E are enlarged views of the circled portions (B, C) of the battery tray.
Figure 8D:
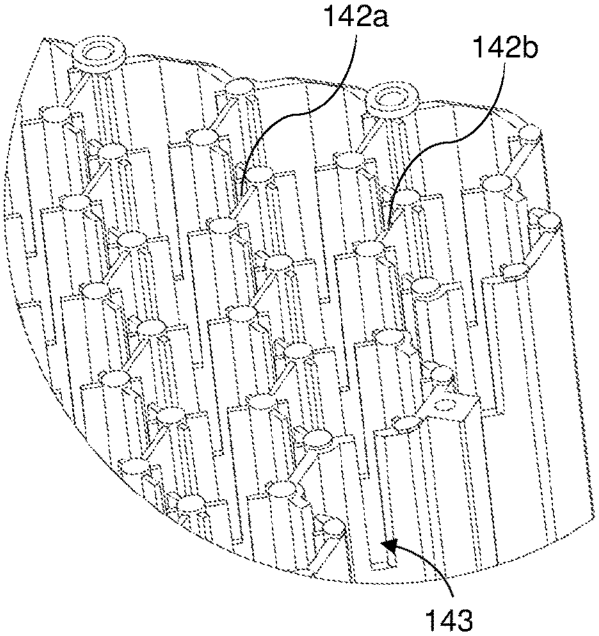
Figure 8E:
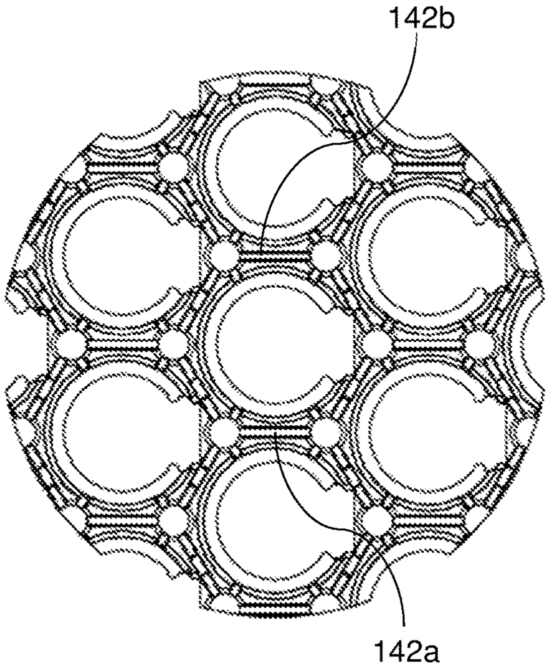

The example battery tray of FIGS. 8A and 8B comprises an example plurality of fourteen receptacle rows (M=14). The example plurality of receptacle rows forming the example battery tray comprises first receptacle row 142_01, last receptacle row 142_14, and an example plurality of 12 intermediate receptacle rows 142_02, . . . , 142_13, which are uniformly distributed between the first receptacle row and the last receptacle row. The first receptacle row is a first end row and the last receptacle row is a second end row of the battery tray. The first end row and the second end row cooperate to define the longitudinal ends of the battery tray in the distribution direction Y. Each receptacle row of the battery tray comprises an example plurality of nine battery receptacles (N=9). The battery receptacles in a receptacle row are identified by a number system for ease of reference. In the number system, the position number of a battery receptacle is with respect to the first end (or first row-end), so that the first receptacle is one which is on the first end, the second receptacle is one next to the first, the third receptacle is one next to the second, . . . , and the last receptacle (or the ninth receptacle in this example) is one on the second end (or second row-end).

The receptacle rows are organized such that immediately adjacent receptacle rows are parallel but laterally offset and alternate receptacle rows are laterally aligned. With this lateral offset configuration, each of the lateral boundaries of the battery tray has a zig-zag profile or a serrated profile. The serrated profile on a first lateral side 146*a* is formed by end walls of the first end-receptacles and the serrated profile on a second lateral side 146*b* is formed by end walls of the second end-receptacles. The extents of lateral offset between adjacent receptacle rows are same in this example battery tray so that each lateral boundary comprises a plurality of indentations and protuberances of uniform lateral extent. The example extent of lateral offset is approximately half-width of the lateral extent (or width) of a battery receptacle so that three consecutive adjacent receptacle rows cooperate to define a half-battery receptacle 148*a* on the first lateral side. Where the receptacle rows have same number of battery receptacles, three consecutive adjacent receptacle rows cooperate to define another half-battery receptacle 148*b* on the second lateral side. Notwithstanding the zigzag boundaries, the example battery tray has a generally rectangular shape which is cooperatively defined by the first and last receptacle rows and the lateral protrusions on the lateral boundaries.

The example battery tray is organized so that odd-numbered rows are laterally aligned with odd-numbered rows, even-numbered rows are laterally aligned with even-numbered rows, and an odd-numbered row and an even-numbered row are laterally offset with respect to each other. When receptacle rows are aligned or laterally aligned, corresponding battery receptacles on the aligned rows have their battery receptacle axes aligned in a direction parallel to the distribution direction Y. Corresponding battery receptacles herein means battery receptacles having same receptacle position numbers with respect to a row end.

The example battery tray has an even number of rows of more than two rows such that the first receptacle row and the last receptacle row are laterally off-set and the first receptacle row and the last-second receptacle row are laterally aligned. When receptacle rows are aligned, the first end-receptacles of the aligned receptacle rows have their receptacle axes on a line which is parallel to the distribution direction Y. Where the receptacle rows have same number of battery receptacle, the second end-receptacles of the receptacle rows have their receptacle axes on a line parallel to the distribution direction Y. When a battery tray has an odd number of rows of more than three rows, the first receptacle row and the last receptacle row are laterally aligned without loss of generality.

Each of the intermediate receptacle rows comprises a plurality of row passageways. Each row passageway passes through two adjacent receptacle rows and spans across all battery receptacles of the two adjacent receptacle rows to define a row-channel. The row-channel is elongate and extends in a direction parallel to the row axis. An intermediate row of the battery tray comprises a first row-channel which is on a first side of the row axis and a second row-channel which is on a second side of the row axis so that the row axis is parallel to and intermediate the first and second row-channels. The example first and second row-channels are symmetrically disposed with respect to the row axis and is equidistant from the row axis of the intermediate row. An end receptacle row (the first receptacle row, the last receptacle row) has a single row passageway which extends to pass through both the end receptacle row and an intermediate row in abutment with the end receptacle row (or end row in short).

Each passageway has an end aperture on the first row-end, and/or an end aperture on the second row-end to facilitate external electrical contact between the connector which passes through the passageway.

The example battery tray is designed for holding prismatic batteries, for example, cylindrical rechargeable batteries. The example battery receptacles are customized for holding 18650 lithium-ion rechargeable batteries, which are cylindrical rechargeable batteries widely used for operation of electrical vehicles and having a rated voltage of about 3.6 volts. An 18650 battery is a single-cell battery having a nominal diameter of 18 mm and a nominal length of 65 mm. Where a battery tray is adapted for holding a single type of batteries, the battery receptacles are designed so that the battery compartments for holding the batteries have same (including substantially same) compartment dimensions. For orderly designs, battery receptacles forming a receptacle row are uniformly distributed along the row direction so that the separation distance between adjacent receptacle axes are uniform throughout the row and have same dimensions. Since the battery receptacles form a receptacle row have same dimensions and have uniform separation distance, receptacle rows having same number of battery receptacles have same length. Where batteries of a battery assembly are single-cell batteries, the inter-battery connector is referred to as intercell connector without loss of generality.

A battery receptacle 142 (or "receptacle" in short) comprises a first axial end, a second axial end which is axially aligned with the first axial end, and an intermediate portion interconnecting the first axial end and the second axial end. The first axial end is an open end having an end aperture which is large enough for a battery terminal to expose for external contact but not large enough for a battery to leave. The second axial end is an open end having an entry aperture which is large enough for axial entry of a battery. The first axial ends of the battery receptacles define the top surface of the tray and the second ends of the battery receptacles define the bottom surface of the tray. The intermediate portion comprises a peripheral wall having an inner surface which surrounds a battery cell compartment. A plurality of spacing fins is formed on the inner surface of the peripheral wall. Each spacing fin projects from the peripheral wall and extends inwardly and the spacing fins cooperate to define an outer periphery of the battery cell compartment. The battery cell compartment, or the outer periphery of the battery cell compartment, is calculated to conform to the outline of the outer periphery of the battery so that a battery is received inside the battery cell receptacle in a closely-fitted manner or with a very small spacing between the battery and the outer periphery of the battery cell compartment. The spacing fins are distributed around the inner surface of the peripheral wall to define a cylindrical compartment and to define an air gap between the battery and the peripheral wall to facilitate heat dissipation during operation of the module when the battery generates heat. The battery cell compartment has a cross-sectional dimension of slightly larger than a diameter of 18 mm, say, 18.2-18.5 mm. In general, an air-gap of about or less than 0.5% on each side would suffice. The air-gap dimension is to be adapted to depend on battery size and or capacity. For an 18650 battery, the air-gap fin is selected to be approximately 1 mm, but a range of between 0.5-1.5 mm may be used.

The battery tray has a first surface (or first tray surface), a second surface (or second surface surface) and a peripheral wall (or tray peripheral wall) interconnecting the first surface and second surface. Each battery receptacle defines a battery cell compartment having a compartment axis which is parallel to or coaxial with the receptacle axis. A corresponding plurality of battery cell compartments defined by the plurality of battery receptacles of the battery tray are distributed within the peripheral wall of the battery tray. The peripheral wall has a generally rectangular outline notwithstanding having serrated sidewalls. The first tray surface is defined by the first axial ends of the battery receptacles and is, more specifically, formed by an aggregate of the first axial ends of the battery receptacles and is orthogonal to the receptacle axes of the battery receptacle. The second tray surface is defined by the second axial ends of the battery receptacles and is, more specifically, formed by an aggregate of the second axial ends of the battery receptacles and is orthogonal to the receptacle axes of the battery receptacle. The tray peripheral wall is parallel to the receptacle axes of the battery receptacle. In example embodiments, the battery tray is formed of strong engineering plastics, for example, polycarbonate or ABS to withstand expected harsh operation conditions.

A battery receptacle 142 comprises a first sidewall portion 142*a*, a second sidewall portion 142*b*, a third sidewall portion and a fourth sidewall portion which cooperate to form the peripheral wall of the intermediate portion surrounding the battery compartment.

The first sidewall portion and the second sidewall portion are opposite facing sidewall portions on the row axis of the receptacle row containing the battery receptacle and on opposite sides of the receptacle axis. The first sidewall portion defines a first lateral boundary of the battery receptacle, the second sidewall portion defines a second lateral boundary of the battery receptacle, and the first sidewall portion and the second sidewall portion cooperate to define the lateral extent (or width) of the battery receptacle. Lateral extent herein is an extent in the direction of the row axis.

Where a battery receptacle is one which is an intermediate battery receptacle in abutment with two adjacent battery receptacles of the same receptacle row, each one of the first sidewall portion and the second sidewall portion is a receptacle wall portion of the intermediate battery receptacle which is shared by the intermediate battery receptacle and one of the abutting adjacent battery receptacles of the same receptacle row. In other words, the first sidewall portion and the second sidewall portion of an intermediate battery receptacle are opposite facing receptacle sidewall portions which are shared by three consecutive battery receptacles on the receptacle row. The first sidewall portion and the second sidewall portion are also partitioning wall portions which provide partitioning among three consecutive battery receptacle compartments on the receptacle row. Where a battery receptacle is an end-receptacle, i.e., one that is on a row end, one of the first sidewall portion and second sidewall portion is shared with an abutting adjacent battery receptacle.

The third sidewall portion and the fourth sidewall portion are sidewall portions on opposite sides of the row axis and on opposite sides of the receptacle axis such that the receptacle axis of the battery receptacle and the row axis of the receptacle row containing the battery receptacle is intermediate the third sidewall portion and the fourth sidewall portion. Each one of the third sidewall portion and the fourth sidewall portion is a sidewall portion which interconnects the first sidewall portion and the second sidewall portion.

The example battery tray comprises a first tray end 144*a* which is a first end of the tray, a second tray end 144*b* which is a second end of the tray, a first tray side which is a first lateral side 146*a* of the tray, and a second tray side which is a second lateral side 146*b* of the tray. The first side wall portion 142*a* of a battery receptable 142 is a sidewall portion which is proximal to the first lateral side (and distal to the second lateral side) of the tray. The second side wall portion 142*b* of a battery receptable is a sidewall portion which is proximal to the second lateral side 146*b* (and distal to the first lateral side) of the tray. The third side wall portion of a battery receptable is a sidewall portion which is proximal to the first tray end 144*a* (and distal to the second tray end). The fourth side wall portion of a battery receptable is a sidewall portion which is proximal to the second tray end 144*b* (and distal to the first tray end).

The receptacle rows are distributed in parallel and in abutment between the first tray end and the second tray end, comprising a first end row, a last end row and a plurality of intermediate rows between the first end row and the last end row. The first end row is a receptacle row on the first tray end and the last end row is a receptacle row which is on the second tray end.

The battery tray has a first end wall which is a peripheral wall on the first tray end and a second end wall which is a peripheral wall on the second tray end. The first end wall is defined by sidewall portions (or more specifically the third side wall portions) of the receptacles on the first end row. The second end wall is defined by sidewall portions (or more specifically the fourth side wall portions) of the receptacles on the last end row. The first tray end comprises a flange portion which projects away from the first end wall. No flange portion is formed on the second tray end so that the first and second ends can be identified more easily. In some embodiments, a flange portion which projects away from the second end wall may be formed. The flange portion is to sit on a corresponding flange formed on the housing when assembled.

The battery tray has a first side wall which is a peripheral wall on the first tray side and a second side wall which is a peripheral wall on the second tray side. The first side wall is formed by sidewall portions (or more specifically the first side wall portions) of the first receptacles of the receptacle rows. The second side wall is formed by sidewall portions (or more specifically the second side wall portions) of the last receptacles of the receptacle rows.

A plurality of conductor outlets is formed on the peripheral wall of the first tray side and/or the second tray side. The conductor outlet is formed as an axially extending slit portion on a side wall portion of a receptacle which defines part of the side wall of the tray. The slit portion is a continuation of a conductor passageway on a receptacle row to permit a portion, for example, a tab portion, of an inter-row connector to protrude or pass through. The number of slit portions required is equal to the number of inter-row connectors which is equal to the number of rows minus one.

Figure 9:
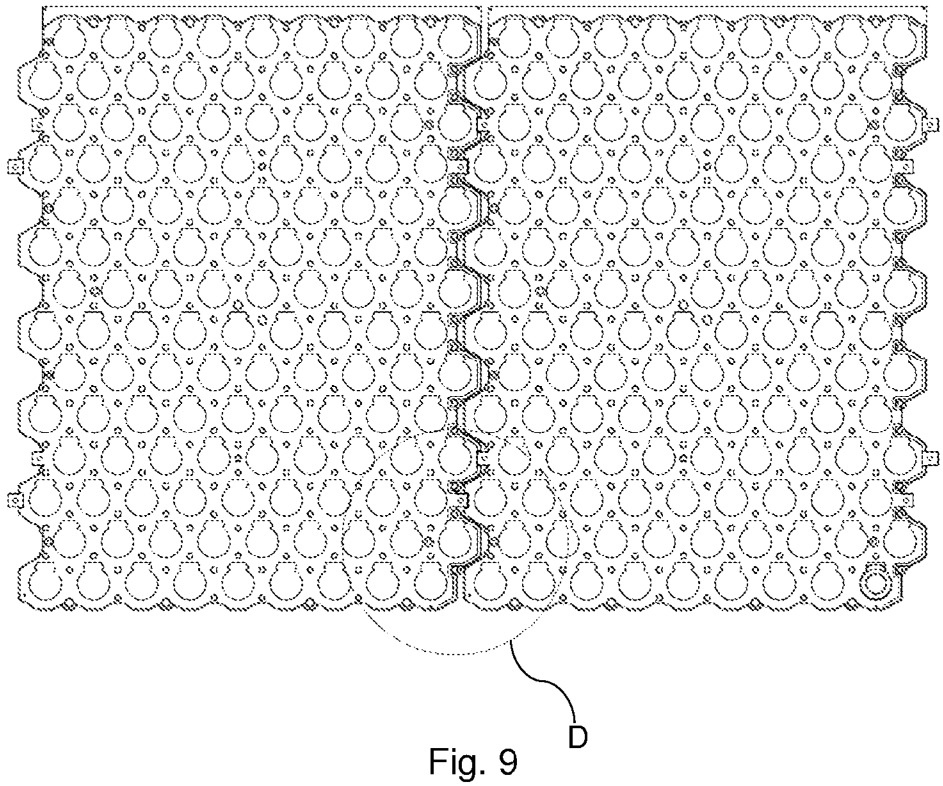
FIG. 9 shows a combined battery tray formed by latching of two battery trays of FIG. 8A.
Figure 9A:
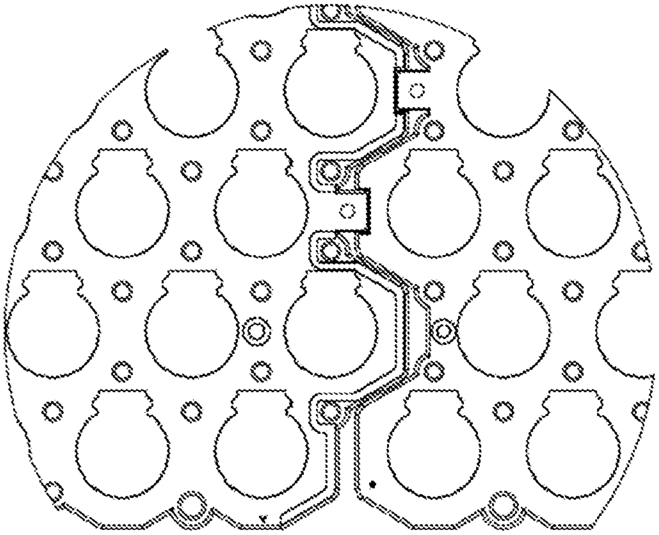
FIG. 9A is an enlarged view of the circled portion (D) of the combined battery tray of FIG. 9, showing interfaces between two battery trays.

A plurality of windows and a corresponding plurality of protrusions are formed on selected locations on the peripheral wall of the first tray side and/or the second tray side. The window is formed as an axially extending slot on a side wall portion of a receptacle which defines part of the side wall of the tray. The protrusion is formed as an axially extending bar which protrudes away from a side wall portion of a receptacle which defines part of the side wall of the tray. A window and a corresponding protrusion of an adjacent tray are complementary to facilitate complementary engagement and latching of adjacent battery trays to form a combined battery tray, as depicted in FIG. 9. The windows and protrusions are disposed such that the first end and the second ends of the component trays are on opposite ends of the tray when combined. This provides flexibility of tray combination so that the trays can be combined to form a battery assembly having the same number of rows as a single tray but a larger number of battery receptacles per receptacle row, or smaller number of battery receptacles per receptacle row.

A combined battery tray having the same number of battery receptacles per receptacle row but a larger number of battery rows, for example, a multiple of the number of receptacle rows, although the component trays are still in side-by-side engagement or latching.

For the avoidance of doubt, the use of ordinal numbers such as first, second, third, fourth, etc., is only for convenience of reference and description and is not meant to indicate a degree of importance or significance, or necessary order or sequence, unless the context otherwise requires.

Where the battery receptacle is an intermediate battery receptacle on an intermediate row, each one of the third sidewall portion and the fourth sidewall portion is a shared sidewall portion which is shared with two abutting battery receptacles of an abutting adjacent receptacle row. More specifically, a third sidewall portion on one intermediate row is a also part of the fourth sidewall portion of a first abutting adjacent battery receptacle and part of the fourth sidewall portion of a second abutting adjacent battery receptacle of first abutting adjacent receptacle row; and a fourth sidewall portion on that intermediate row is a also part of the third sidewall portion of a first abutting adjacent battery receptacle and part of the third sidewall portion of a second abutting adjacent battery receptacle of second abutting adjacent receptacle row.

The peripheral wall of the intermediate portion of the example battery receptacle has the shape of a prismatic hexagon having the receptacle axis as the center axis or the prismatic axis. Each of the first sidewall portion and the second sidewall portion forms a wall of the prismatic hexagon which is orthogonal to the row axis and the first sidewall portion and the second sidewall portion are directly opposite facing. Each of the third sidewall portion and the fourth sidewall portion comprises two abutting sidewalls of the prismatic hexagon. The example battery receptacle has the shape of a regular hexagon such that the sidewalls of the hexagon have same length. The battery receptacles are distributed resembling distribution of cells of a beehive, such that a typical battery receptacle is surrounded in abutment by 6 surrounding battery receptacles and the sidewalls of the typical battery receptacle are shared with the 6 surrounding battery receptacles.

A typical battery receptacle of an intermediate row comprises a first passageway portion which is formed on the third sidewall portion and a second passageway portion which is formed on the fourth sidewall portion. Each passageway portion is parallel to the row axis and is defined by a first slit portion and a second slit portion. The slit portion 143 is formed on a sidewall of the hexagonal battery receptacle which for part of the third sidewall portion or part of the fourth sidewall portion. Each slit portion extends along a slit axis which is parallel to the receptacle axis and orthogonal to the row axis. An intermediate battery receptacle on an intermediate row is a typical battery receptacle in the present context.

Slit portions on the third sidewall portions of the battery receptacles on an intermediate receptacle row forms an ensemble of slit portions. The ensemble of slit portions defines a first passageway which extends across all battery receptacles on the receptacle row to provide a through passage for an inter-battery-row conductor.

Slit portions on the fourth sidewall portions of the battery receptacles on an intermediate receptacle row forms an ensemble of slit portions. The ensemble of slit portions defines a second passageway which extends across all battery receptacles on the receptacle row to provide a through passage for an inter-battery-row conductor.

The battery receptacles on an end row have either a slit third sidewall portion or a slit fourth sidewall which forms a passageway portion through passageway. A flange is formed on one of the end rows and projects away from the battery receptacles in a direction parallel to the distribution axis.

The slit portions of each passageway portion begin from the second axial end of the tray and extends axially towards the first axial end for an axial depth. Each passageway portion has an entry aperture defined by the slit portions to permit a portion of the row link to enter the passageway portion.

The plurality of windows and the corresponding plurality of protrusions cooperate to form a plurality of tray alignment devices. An alignment device is formed on some of the end battery receptacles. The alignment device comprises an axial protrusion and an axial slot which are formed on an end sidewall portion which is not shared with another battery receptacle. The end sidewall portion can be a first sidewall portion or a second sidewall portion. The axial protrusion protrudes away from the end sidewall portion along the row-axis direction and extends in an axial direction which is on the row axis and parallel to the receptable axis. The axial slot has a slot axis which meets the row axis and which extends in an axial direction parallel to the receptable axis. The axial protrusion and the axial slot extend for half or less than the height of the sidewall portion. Height of a sidewall portion is its dimension measured in a direction parallel to the receptacle axis. An axial through bore is formed on the axial protrusion to permit a pin to passthrough to enter onto the bored protrusion of another battery tray when the battery assembly comprises more than one battery tray of batteries.

To assemble a battery module, the first contact tabs of an inter-row connector is inserted into a receptacle row from the second axial end and moved towards the first axial end until the first contact tabs has reached the first axial end of the battery receptacles.

When the first contact tabs have reached its designated position, the row tab 118 of the inter-row connector is in place and seats inside a passageway, with its major surfaces facing the batteries in interconnection and parallel to the battery axes. The row tab penetrates through the row of battery receptacles along a path defined by the passageway and has an end tab portion 118*a* which projects out of the battery tray. When the row tab is in position, the first contact tabs are in receptacles of one receptacle row and the second contact tabs ate in receptacles of another receptacle row which share the row tab passageway with the receptacle row.

When the first contact tabs have reached the first axial end, the second contact tabs will be on the second axial end of the battery receptacles.

After all the inter-row connectors are in place, the batteries are inserted into the battery receptacles and the battery terminals will be electrically connected with the corresponding contact tabs, for example, by fusion welding such as laser welding or spot welding to integrally connect the battery terminals and the corresponding contact tabs.

Where a battery comprises a plurality of battery modules, a plurality of battery trays of the corresponding plurality of battery modules are placed side by side and inter-row connectors having row tabs which are long enough to pass through the battery modules are placed inside the battery trays and similar steps are to be performed.

In some embodiments, the individual battery modules may be assembled separately, mounted on the housing and then having the inter-row connectors electrically joined together.

After the battery module or battery modules have been assembled, the base plate is attached to a bottom surface of the battery module(s) by means of an electrically insulating thermal contact medium to complete the construction of a thermal exchange assembly of the module to facilitate effective thermal exchange between the heat transfer network and the base plate. The heat transfer assembly comprises the inter-row connectors of the battery assembly and the base plate as an example of a thermal exchange device. Where the batteries are not connected by inter-row connectors, the heat transfer assembly is formed by an ensemble of individual inter-battery connectors and the thermal exchange device without loss of generality. In this example, the second battery terminal is a negative terminal of a battery and the negative terminals of the batteries of the battery assembly are welded with the second contact tabs which are thermally joined with the base plate. When a battery module is assembled, a battery is received inside a battery receptacle, for example, with its battery axis aligned with the receptacle axis, the first contact tab is proximal to and exposed on the first module surface and is in physically and electrically joined with the first battery terminal, the second contact tab is proximal to and exposed on the second module surface and is in physically and electrically joined with the second battery terminal, and the inter-battery link of an inter-battery connector is inside the battery receptacle and extends between the first contact tab and the second contact tab. An inter-battery link extends between two adjacent receptacles rows and between adjacent receptacles on adjacent receptacle rows. The first link portion of an inter-battery connector is inside the receptacle of one battery while the second link portion of the inter-battery connector is inside the receptacle of another battery. The intermediate link portion or the row link is in both receptacles. A row link portion is held in position by a passageway formed on the battery receptacle and is held on an axial level above an axial end by the slit portion of the battery receptacle. The axial extent of the example slit portions which define a passageway portion on a battery receptacle has an example length of 22 mm, which is about one-third of the axial extent of a typical battery receptacle of the example tray. In general, a slit portion having an axial extent of more than 20%, 25%, 30% and less than 35%, 40% of the axial length of the battery would provide a good balance. The link portions of an inter-battery connector are configured to extend inside the air gap portion of the battery receptacle which is defined by the spacing fins and the battery. The first link portion and the second link portion are laterally displaced since abutting receptacles on abutting receptacle rows are laterally displaced.

In example embodiments such as the present, the first link portion extends axially inside a battery receptacle and the second link portion extends axially inside an adjacent battery receptacle on an adjacent receptacle row. The example first link portion extends and the row link are orthogonal to each other, defining a T-section inside the battery receptacle. The example second link portion extends and the row link are orthogonal to each other, defining another T-section inside a battery receptacle. A T-section formed by two mutually orthogonal tab-portions forms a more stable connector structure inside a battery receptacle. Each battery receptacle has either a first link portion or a second link portion, but not both.

To mitigate risks of electrical contact between adjacent battery terminal contact tabs on abutting receptacle rows while minimizing space between adjacent rows, adjacent rows of contact tabs may be partially insulated electrically. For example, an electrical insulation medium may be applied on a portion of the second tab which is in abutment with the intermediate link portion of an inter-battery connector. In example embodiments, an electrically insulating (preferably non-thermally insulating) tape may be applied across a row of second contact tabs to cover the portions of the second contact tabs which are proximal the intermediate link portions to mitigate potential risks of electrical contact between second contact tabs of abutting receptacle rows. Since the first contact tabs usually have smaller surface dimensions than the second contact tabs, electrical insulation may not be necessary for adjacent rows of first contact tabs.

Referring to FIG. 9, the example battery tray comprises an example plurality of M=14 receptacle rows and an example plurality of N=9 battery receptacles per row. The two battery modules forming the example battery assembly are mounted side-by-side with the rows aligned so that each row of the battery assembly comprises N=18 batteries. The inter-row connector has N first terminal tabs and N second terminal tabs. While the inter-battery connectors are distributed in the row direction and such that adjacent inter-battery connectors have a generally uniform separation distance, the separation distance between two immediately adjacent inter-battery connectors on two adjacent battery trays is larger than the separation distance between two immediately adjacent inter-battery connectors on the same battery tray. With the M rows of batteries in series connection, the battery assembly has an output voltage equal to $MV_b$, where $V_b$ is the voltage of each battery row. For an 18650 battery, $V_b$ is taken as 3.6 V and the battery assembly has a voltage of about 50.4 V.

When the inter-row connectors and the batteries are duly put in place in the trays and battery assembled, batteries of a receptacle row are in parallel electrical connection and the battery rows or adjacent battery rows are serially connected. When so assembled, the first battery terminals of the batteries in a row are connected to first contact tabs of one inter-row connector and the second battery terminals of all batteries in the row are connected to the second contact tabs of another inter-row connector. The first battery terminals of the batteries in a row are at same electrical potential due to electrical interconnection of the first battery terminals by the row tab of one inter-row connector. The second battery terminals of the batteries in the row are at same electrical potential due to electrical interconnection of the second battery terminals by the row tab of another inter-row connector.

After the battery modules have been assembled, the base plate 120 is attached to the battery modules to form a battery assembly 100. The battery assembly is mounted on the housing and electrically connected to the battery management circuitry. When the battery assembly is mounted, its top surface is proximal and facing the ceiling of the discharge chamber. The example batteries of the example battery module have a safety vent which is adjacent the positive terminal, which is the first battery terminal. When the battery assembly is duly mounted, the first battery terminals of the battery are aligned on the top surface of the battery tray and are exposed to the air chamber and opposite-facing the ceiling of the air chamber.

Before the battery assembly is mounted on the upper housing portion, thermal sensors are mounted on the discharge chamber to facilitate detection of temperature inside the battery compartment. In this example, the venting apertures are formed on the top wall of the housing and are symmetrically distributed on two sides of the longitudinal center axis of the housing. The venting apertures 232 are distributed near the middle portion of the top wall of the upper housing portion. The inner surface of the top wall defines the ceiling of the discharge chamber, which is also the ceiling of the battery compartment since the discharge chamber is a portion of the battery compartment in this example. A thermal sensor is mounted on the venting apertures so that temperature inside the battery compartment can be monitored and temperature of gaseous discharge which exits the battery compartment through the venting apertures can be detected. In some embodiments, the thermal sensor may be mounted on other locations of the battery compartment 106 or the discharge compartment 108 in alternative or as an addition. The battery compartment is configured so that gaseous discharge emanating from a battery of the battery module can only exit through the venting apertures. In example embodiments, the upper housing portion of the housing is integrally formed of a non-air permeable material (hard plastics) with the venting apertures integrally molded. When the upper housing portion and the battery assembly are duly assembled, the base plate and the upper housing portion cooperate to form an air-tight battery compartment except at the venting apertures.

To facilitate more accurate detection of temperature inside the battery compartment, or more particularly the discharge chamber, which is the portion of the battery compartment intermediate the battery assembly and the housing, the upper housing portion is made of a thermally insulating material such as hard plastics so that the discharge chamber is thermally isolated from the ambient air to mitigate non-detection of an abnormally high temperature due to heat exchange between air inside the discharge chamber and ambient air through the upper housing portion, such heat exchange may cause a drop in temperature inside the battery compartment and adversely affect accurate detection of adverse battery conditions and timing of activation of counter-measures.

When the battery assembly is in place, the safety vents of the batteries are proximal and exposed to the top surface of the battery assembly and to the discharge chamber. When the safety vent of a faulty battery operates to release hot gas from the battery, the hot gas inside the faulty battery will exit from the top or top portion of the battery as hot gaseous discharge and move directly into the discharge chamber.

A battery may deteriorate and gradually become a faulty battery, for example due to aging and weathering. When a battery becomes a faulty battery, it may begin to have a higher temperature and hot gas may emit from the battery. The initial rate of gaseous emission speed is usually relatively low and the initial hot gas temperature is also relatively low, for example, at between 100-120 degrees Celsius (° C.). When the temperature of the battery increases further to a critical temperature, for example, the melting temperature of the electrode separator of a battery, melt down of the separator will expedite and aggravate battery damage and the temperature of hot gas discharged by a faulty battery can rapidly reach 500 or 650 or even 800 or 1000 degrees Celsius. The high temperature of a faulty battery can spread to adjacent batteries of the battery module and may cause thermal runaway and possible explosion. Electrode separators are typically made of polyethylene, which has a melting temperature 133° C., or polypropylene, which has a melting temperature of 159° C. The melting temperature of the separator may be taken as a critical temperature for battery condition monitoring.

In some embodiments, a first cooling power may be applied when a first activation temperature is detected and a second higher cooling power may be applied when a second, higher, activation temperature is detected after a predetermined time after activation of the cooling power to cool down the battery assembly.

So that temperature inside the battery compartment can be detected without having a thermal sensor for each battery, a number of thermal sensors, which is substantially smaller than the number of batteries, is distributed to detect temperature inside the discharge chamber. The thermal sensors in the present example are distributed inside the discharge chamber and configured to detect temperature of the discharge compartment, which is the portion of the battery compartment proximal to the safety vents of the batteries and defining the discharge chamber.

To mitigate mixing of hot gas discharge emanating from a battery with air in the discharge chamber, the discharge chamber is configured so that gaseous discharge can flow to a venting aperture in a short distance. For example, the venting apertures and the thermal sensors are distributed on the ceiling of the discharge chamber so that hot gas emanating from a battery can travel upwards to the ceiling and then to the venting aperture where or near where a thermal sensor is located.

To minimize distance that the hot gaseous discharge has to travel to reach a thermal sensor or a venting aperture, the axial extent of the discharge chamber is configured to be substantially smaller than the axial extent of the battery compartment. For example, the axial extent of the air chamber may be less than more than 5%, 10%, or 15% but less than 20%, 25% or 30% of the axial extent of the battery compartment. The axial extent of the discharge chamber may be less than 20%, 25%, 30% or 40% and more than 5%, 10% or 15% of the axial extent of the battery assembly.

So that hot gaseous discharge can be guided to move only through a short distance in the discharge chamber before reaching a closest thermal sensor or a closest venting aperture which is closest to the discharging battery, a plurality of fluid movement guides is formed on the ceiling to surround a venting aperture. Each fluid movement guide defines a guide track which is radially extending with respect to the venting aperture and the guide tracks formed by a plurality of fluid movement guides define a plurality of tapered channels each of which tapers to narrow on extending towards the venting aperture. The guide tracks extend orthogonally to the axial direction of the battery assembly, which is also the axial direction of the battery, and provides a guide for the hot gaseous discharge to move from the safety vent of the battery to the venting aperture 232 in a short distance and minimize mixing of the hot gas discharge with air of the air chamber so that the temperature of the hot gaseous discharge is substantially maintained when arrived at the thermal sensor, also known as temperature sensor.

The end tab portions 118*a* of the inter-row connectors at the end rows of the battery assembly are connected to power input and power output terminals of the module. The end tab portions of the inter-row connectors of the intermediate rows are connected to the battery management circuitry to facilitate management of battery voltage at each battery row.

In example embodiments, the control circuitry is configured to monitor temperature of the batteries by monitoring temperatures at the plurality of venting apertures, for example, by means of thermal sensors. When the temperature detected at a venting aperture exceeds a predetermined threshold value, safety measures may be activated by the control circuitry. The safety measures may include shut down of a battery module, isolation of batteries or battery groups, for example, by fuses, or activation of cooling measures by operation of the fans. When battery cooling measures are activated within a short time of detecting an alert temperature, movement of cooling air through the air compartment which hopefully rapidly cool down a damaged battery or damaged batteries to below a critical temperature, above which the risks of battery melt down due to thermal runaway may increase substantially.

In some embodiments, active cooling measures, for example, by use of thermoelectric cooling devices such as Peltier devices may further expedite the cooling process. The active cooling elements may be attached to the thermal exchange device and/or on the bottom portion of the housing as a convenient example.

As the inter-battery connectors are directly connected to the battery terminals, especially the battery terminal when a battery safety vent is located, the network of inter-battery connectors functions as a heat transfer network for transfer heat from interior of the batteries to the thermal exchange device. Furthermore, the configuration of the inter-battery connectors, especially the configuration of the intermediate link portion as comprising exposed metal flaps also helps to dissipate heat during normal operation of the battery assembly and helps to maintain the battery to operate at preferred or desirable operating temperatures.

During operations, if an activation temperature is detected by a thermal sensor, the control circuitry will activate counter-measures to cool down the battery assembly to prevent or mitigate risks of thermal runaway and possible meltdown. In example embodiments, once a critical temperature is detected by a thermal sensor, say 80° C. or 90° C., the fans will be activated to accelerate heat exchange between the battery module and the air in the air compartment and the process would help to cool down the battery assembly. In some embodiments, active thermal cooling may be used in addition or as an alternative. In some embodiments, external fans may be used and cold air may be supplied by an external source. The battery groups may also be shut down, for example by fusible links upon detection of a critical temperature. In some embodiments, the control circuitry may operate to shut down a battery module or the battery assembly when the temperature reaches a second, higher temperature, say 100° C. A battery module may be shut down, for example, by isolation by electronic switches such as semiconductor switches or fuses. In addition, the control circuitry may generate an alert signal when a critical temperature has reached. The alert signal may include a local alarm on the module and/or a remote alarm to be sent out of the module, for example, via a telecommunication network through a telecommunication frontend of the module.

A thermal exchange assembly of the present disclosure is configured as a heat sink, and more specifically, a distributed heat sink comprising a distributed heat transfer network formed by the inter-battery connectors. The thermal exchange assembly as a distributed heat sink has an inherent ability to equalize temperature of batteries forming a battery module or a battery assembly. The temperature equalizing ability can be enhanced by active cooling by forced air movement or thermal electric cooling to expedite thermal exchange with the thermal exchange assembly.

Batteries typically have a specified operation temperature range, which is defined between a minimum operation temperature and maximum operation temperature. Most Li-ion cells are manufactured to operable below a maximum temperature of around 60~65° C. An operation temperature which is well below the maximum temperature is generally preferred for longer battery life and longer-term safety.

The example module may be configured so that the batteries are to operate at a preferred operation temperature range which is an intermediate temperature range selected between the maximum temperature and the minimum temperature. For example, the module may be configured to operate so that the operation temperatures of the batteries are kept at or below an upper temperature limit, say 40° C. or 42° C. When batteries reach the upper temperature limit, the control circuitry will activate the cooling arrangement to bring the battery temperatures down towards the lower limit of the intermediate temperature range, for example, to bring down to the upper temperature limit or at a few degrees, say 1, 2, or 3 degrees, below, and the process will continue and repeated. In general, an intermediate temperature range of between 25° C. and 42° C. has been found to be preferable.

The control of battery operation temperature in an intermediate temperature range which is selected between the maximum and minimum temperatures requires more extensive and accurate battery temperature monitoring. To facilitate more extensive and accurate battery temperature monitoring, a plurality of temperature sensors such as temperature probes are placed inside the battery receptables to monitor battery temperatures and control operation of the cooling arrangement by the control circuitry.

The temperature sensors may be utilized to control temperature imbalances among batteries of the battery assembly or module. For example, when a temperature imbalance exceeding an imbalance threshold is detected, the control circuitry will operate the cooling arrangement to bring the battery temperatures down, wherein the temperature imbalance is mitigated. An example imbalance threshold may be selected as between 3-5° C. as a convenient example.

The heat transfer network comprises a matrix of thermal transfer members which is physically connected to the battery assembly and extends through the battery receptacles of the battery assembly. The thermal transfer member has a first end which is physically connected to a first battery terminal of one battery and a second end which is connected to a second battery terminal of another battery. The second end of the thermal transfer member is also connected to a main thermal exchange device, which is physically connected to an axial end of the battery assembly. The main thermal device has a thermal contact surface which is in physical contact with the thermal transfer network but is electrically insolated therefrom. The main thermal exchange device has a thermal exchange surface which is physically connected with the thermal contact surface for efficient heat transfer. In example embodiments, the thermal exchange surface and the thermal contact surface are opposite facing major surfaces of a conductive plate such that the thermal exchange surface and the thermal contact surface are integrally connected by a thermally and electrically conductive material. In some embodiments, the thermal contact surfaces are delineated into a plurality of insulated or isolated electrically conductive regions and each electrically conductive region is for making thermal but not electrical contact with a group of heat transfer members such as an array or of hear transfer members. The heat transfer members are connected to thermal contact surface by a thermal conductive medium which is electrically insulating to block electrical contact between the heat transfer network and the main thermal exchange device. The thermal transfer members are arranged in arrays or rows and the arrays or rows of thermal transfer members extend in an axial direction which is generally orthogonal to the thermal contact surface to form a 3-dimensional heat transfer assembly. An example heat transfer member is also an inter-battery connector comprising a first batter terminal tab which is in physical and electrical contact with a first battery terminal and an inter-battery link which extends inside and through a battery receptacle to reach the thermal contact surface.

While the disclosure has been made with reference to examples and embodiments, the examples and embodiments are not intended to be limiting.

The invention claimed is:

1. A battery module comprising a plurality of battery units, a thermal exchange arrangement, management circuitry and a module housing;

wherein the thermal exchange arrangement comprises a heat transfer network and a thermal exchange device in thermal connection with the heat transfer network, wherein the thermal exchange device comprises a thermally conductive plate which partitions the module housing into a first housing portion that defines a battery compartment and a second housing portion that defines an air compartment, wherein the thermally conductive plate has a thermal exchange surface for thermal exchange with ambient air or with air inside the air compartment, and wherein the heat transfer network is for collecting heat from terminals on opposite axial ends of the battery units and for transferring the heat collected to the thermal exchange device for the thermal exchange; and wherein the management circuitry comprises an air-moving arrangement which is operable to move air through the air compartment to expedite the thermal exchange.

2. The battery module of claim 1, wherein the battery compartment is a closed compartment inside which the plurality of battery units is received, wherein the heat transfer network comprises a plurality of interrow connectors, and an interrow connector of the plurality of interrow connectors thermally and electrically interconnects two adjacent rows of battery units, wherein the interrow connector comprises a plurality of inter-battery connectors and a row conductor which electrically interconnects the plurality of inter-battery connectors, and wherein the row conductor is integrally formed from a single metal sheet.

3. The battery module of claim 2, wherein the plurality of inter-battery connectors is thermally connected to but electrically insulated from the thermal exchange device, and wherein the inter-battery connectors are distributed in a row direction and the row conductor extends in the row direction to interconnect the plurality of inter-battery connectors, the interrow connector being integrally formed from a single metal sheet.

4. The battery module of claim 2, wherein the thermally conductive plate is a base plate that cooperates with an upper portion of the module housing to form the battery compartment and a discharge compartment above the battery compartment, and cooperates with a lower portion of the module housing to form the air compartment;

wherein the thermally conductive plate has a thermal contact surface which is in thermal connection with the heat transfer network, the thermal contact surface and the thermal exchange surface being opposite-facing major surfaces of the base plate.

5. The battery module of claim 1, wherein the air compartment is a closed compartment and the management circuitry comprises an array of fans which is arranged to move air into and out of the air compartment to expedite the thermal exchange.

6. The battery module of claim 2, wherein a battery unit of the plurality of battery units has:

an elongate battery body including a first axial end and a second axial end which are opposite axial ends, and a first terminal of a first polarity on the first axial end of the battery body and a second terminal of a second polarity on the second axial end of the battery body, the first axial end and the second axial end being opposite axial ends;

wherein an inter-battery connector of the interrow connector comprises a first contact tab, a second contact tab and an inter-terminal link which interconnects the first contact tab and the second contact tab, wherein the first contact tab is for connection to the first terminal of a first battery, the second contact tab is for connection to the second terminal of a second battery which is adjacent to the first battery, and wherein the inter-terminal link is an inter-battery tab interconnecting the first and second batteries and extending in a row direction.

7. The battery module of claim 6, wherein the inter-battery link comprises a first link portion, a second link portion and an intermediate link portion interconnecting the first link portion and the second link portion, and wherein a link portion is a tab portion having a tab geometry or a flap portion having a flap geometry.

8. The battery module of claim 7, wherein the tab portion has a major surface and a minor surface, and wherein the major surface has an area that is 5 times, 10 times, 15 times, 20 times or more of the area of the minor surface.

9. The battery module of claim 7, wherein the first link portion comprises a first metal flap portion which integrally connects the first contact tab and the intermediate link portion, wherein the second link portion comprises a second metal flap portion which integrally interconnects the second contact tab and the intermediate link portion, wherein the first contact tab projects away from the first metal flap portion in a first projection direction, and wherein the second contact tab projects away from the second metal flap portion in a second projection direction opposite to the first projection direction.

10. The battery module of claim 7, wherein the first metal flap portion, the second flap portion and the intermediate link portion have coplanar major surfaces.

11. The battery module of claim 1, wherein the plurality of battery units is arranged into a plurality of battery rows, wherein two adjacent battery rows of the plurality of battery rows are connected in series by an interrow connector and the plurality of battery units is connected by a plurality of interrow connectors, and wherein the heat transfer network comprises the plurality of interrow connectors.

12. The battery module of claim 11, wherein the interrow connector comprises a plurality of inter-battery connectors interconnected by an elongate row conductor which extends along a row direction to form an array of inter-battery connectors, wherein the inter-battery connectors forming the array are distributed in a row direction to form a series of inter-battery connectors, and wherein the interrow connector comprises a plurality of terminal contacts which is connected to battery terminals of a row of battery units having a first polarity, and the plurality of terminal contacts is in thermal connection with the thermal exchange device.

13. The battery module of claim 12, wherein the row conductor or the interrow connector is integrally formed from a single metal sheet.

14. The battery module of claim 11, wherein the inter-row connector comprises a plurality of first metal flap portions which is distributed along a row direction to form a row of first metal flap portions, a plurality of second metal flap portions which is distributed along the row direction to form a row of second metal flap portions, and a plurality of intermediate metal flap portions which is distributed along the row direction to form a row of intermediate metal flap portions; and wherein the plurality of intermediate metal flap portions extends along the row direction to define the dimension of the inter-row connector in the row direction.

15. The battery module of claim 11, wherein the inter-row connector comprises a plurality of first metal flap portions which is distributed along a row direction to form a row of first metal flap portions, a plurality of second metal flap portions which is distributed along the row direction to form a row of second metal flap portions, and an elongate row tab which is a row link extending in the row direction to interconnect the first metal flap portions and the second metal flap portions.

16. The battery module of claim 11, wherein the thermally conductive plate is in thermal connection with bottom terminals of the plurality of battery units, and is distal from top terminals of the plurality of battery units, the top terminals and the bottom terminals being on opposite axial ends of the battery units.

17. The battery module of claim 16, wherein the thermally conductive plate is to facilitate thermal exchange between the battery units and air inside the air compartment or ambient air.

18. The battery module of claim 16, wherein the plurality of battery units is held in a battery tray comprising a corresponding plurality of battery receptacles.

19. A power supply apparatus comprising a main housing on which a stored energy source, a power interface, and electronic circuitries for controlling operations are retained;

wherein the stored energy source comprises a battery assembly including a battery module or a plurality of battery modules, and wherein a battery module of the battery assembly comprises a plurality of battery units, a thermal exchange arrangement, management circuitry and a module housing;

wherein the battery units of the battery module are connected in series and in parallel by a plurality of interrow connectors, and the plurality of interrow connectors forms a heat transfer network;

wherein the thermal exchange arrangement comprises the heat transfer network and a thermal exchange device in thermal connection with the heat transfer network, wherein the thermal exchange device comprises a thermally conductive base plate which cooperates with the module housing to form a closed battery compartment in which the plurality of battery units of the battery module is received and an air compartment;

wherein the thermal exchange device has a thermal exchange surface for thermal exchange with ambient air or with air inside the air compartment, wherein the plurality of interrow connectors is for collecting heat from terminals on opposite axial ends of the battery units and for transferring the heat collected to the thermal exchange device for the thermal exchange, and wherein the management circuitry comprises an air-moving arrangement which is operable to move air through the air compartment to expedite the thermal exchange.

20. The power supply apparatus of claim 19, wherein the base plate has a thermal contact surface which is in thermal connection with terminals of the battery units by means of the plurality of inter-battery connectors, the thermal contact surface and the thermal exchange surface being opposite-facing major surfaces of the base plate;

wherein the plurality of battery units is arranged into a plurality of battery rows, wherein two adjacent battery rows of the plurality of battery rows are connected in series and in parallel by an interrow connector, wherein the interrow connector comprises a plurality of inter-battery connectors distributed in a row direction, wherein an inter-battery connector of the interrow connector comprises an inter-battery link portion which is a tab portion, and wherein the inter-battery link portions of the interrow connector are integrally connected by an elongate row tab which extends in the row direction.

* * * * *